US008090627B2

(12) United States Patent
Nagahara et al.

(10) Patent No.: US 8,090,627 B2
(45) Date of Patent: Jan. 3, 2012

(54) PRINTING SYSTEM, PRINTING PROGRAM, PRINTING METHOD, SERVER APPARATUS, SERVER APPARATUS PROGRAM, PRINTER, PRINTING SYSTEM PROGRAM, AND RECORDING MEDIUM HAVING PROGRAMS STORED THEREIN

(75) Inventors: Atsushi Nagahara, Chino (JP); Toshio Tanaka, Shiojiri (JP)

(73) Assignee: Seiko Epson Corporation (JP)

( * ) Notice: Subject to any disclaimer, the term of this patent is extended or adjusted under 35 U.S.C. 154(b) by 1610 days.

(21) Appl. No.: 11/386,020

(22) Filed: Mar. 21, 2006

(65) Prior Publication Data

US 2006/0215192 A1    Sep. 28, 2006

(30) Foreign Application Priority Data

Mar. 22, 2005  (JP) ................. 2005-081182
Apr. 4, 2005   (JP) ................. 2005-107151
Dec. 26, 2005  (JP) ................. 2005-372136

(51) Int. Cl.
*G06Q 30/00*  (2006.01)

(52) U.S. Cl. ............. 705/26.81; 705/1.1; 705/26.1; 705/26.8; 358/1.1

(58) Field of Classification Search .............. 705/26, 705/27, 26.1–27.2; 358/1.9
See application file for complete search history.

(56) References Cited

U.S. PATENT DOCUMENTS

| | | | |
|---|---|---|---|
| 6,283,571 B1 | 9/2001 | Zhou et al. | |
| 6,293,643 B1 | 9/2001 | Shimada et al. | |
| 6,328,404 B1 | 12/2001 | Fujimori | |
| 7,145,677 B2 | 12/2006 | Shimbori et al. | |
| 7,899,269 B2* | 3/2011 | Kuwata | 382/284 |
| 2004/0186800 A1* | 9/2004 | Ohshima et al. | 705/30 |
| 2008/0071605 A1* | 3/2008 | Asauchi et al. | 705/10 |

FOREIGN PATENT DOCUMENTS

| | | |
|---|---|---|
| JP | 01-129667 | 5/1989 |
| JP | 01-235655 | 9/1989 |
| JP | 03-162977 | 7/1991 |
| JP | 05-220977 | 8/1993 |
| JP | 11-254662 | 9/1999 |
| JP | 2000-190470 | 7/2000 |
| JP | 2001-356891 | 12/2001 |
| JP | 2002-304261 | 10/2002 |

OTHER PUBLICATIONS

"New technology news in brief." Anonymous. Management Services. Enfield: Jul. 2003. vol. 47, Iss. 7; p. 26. Retrieved via ProQuest on Aug. 25, 2011.*

* cited by examiner

*Primary Examiner* — Michael Misiaszek
(74) *Attorney, Agent, or Firm* — Harness, Dickey & Pierce, P.L.C.

(57) ABSTRACT

A printing system includes a client apparatus which deals with printing data and a server apparatus which is connected to the client apparatus to communicate therewith. The client apparatus includes: a correction data request transmitting unit which requests the server apparatus to transmit correction data used for correcting the printing data; a correction data receiving unit which receives predetermined correction data transmitted; a billing information receiving unit; and a billing unit which performs a predetermined process on the basis of the billing information received by the billing information receiving unit. The server apparatus includes: a correction data request receiving unit; a correction data acquiring unit which acquires, from a correction data storage unit, predetermined correction data corresponding to the request to transmit the correction data received by the correction data request receiving unit; a correction data transmitting unit; a charge calculating unit; and a charge notifying unit.

10 Claims, 11 Drawing Sheets

| NOZZLE NUMBER | DOT SIZE |
|---|---|
| 1 | +2 |
| 2 | +1 |
| 3 | 0 |
| . | . |
| . | . |
| . | . |
| 1438 | 0 |
| 1439 | 0 |
| 1440 | +2 |

IDEAL DOT PATTERN

DOT PATTERN IN WHICH DISCHARGE
AMOUNT OF INK IS NONUNIFORM

PRINTING SYSTEM, PRINTING PROGRAM, PRINTING METHOD, SERVER APPARATUS, SERVER APPARATUS PROGRAM, PRINTER, PRINTING SYSTEM PROGRAM, AND RECORDING MEDIUM HAVING PROGRAMS STORED THEREIN

RELATED APPLICATIONS

This application claims priority to Japanese Patent Application Nos. 2005-081182 filed Mar. 22, 2005, 2005-372136 filed Dec. 26, 2005 and 2005-107151 filed Apr. 4, 2005 which are hereby expressly incorporated by reference herein in their entirety.

BACKGROUND

1. Technical Field

The present invention relates to a system including a client apparatus having a printing function, such as an inkjet printer or a laser printer, and a server apparatus connected to the client apparatus so as to communicate therewith over, for example, a network. In particular, the invention relates to a printing system for performing a billing process on a service supplied to a client apparatus, to a printing program, to a printing method, to a server apparatus, to a server apparatus program, to a printer, to a printing system program, and to a recording medium having these programs stored therein.

2. Related Art

In general, printers of an inkjet type (hereinafter, referred to as 'inkjet printers') are inexpensive and print high-quality images. Therefore, with the propagation of personal computers and digital cameras, the inkjet printers have come into widespread use for home as well as for office.

In general, in the inkjet printer, a movable body including an ink cartridge and a printing head which are integrally formed with each other is reciprocated on the right and left sides of a sheet feeding direction on a printing medium (a sheet), with liquid ink particles being discharged (jetted) from nozzles of the printing head in the shape of dots, to print predetermined characters or images on a printing sheet, thereby creating a desired printed matter. In addition, the carriage is provided with four color (yellow, magenta, cyan, and black) ink cartridges and four printing heads corresponding to the colors, which makes it possible to easily print a full color image having a mixed color of the four colors as well as a monochromatic image (further, light cyan and light magenta may be added to these four colors to realize six, seven, or eight colors).

However, the printing head indispensable for the inkjet printer has a plurality of nozzles, each having a diameter of 10 to 70 μm, which are linearly arranged at intervals of about several tens of micrometers and are also arranged in the printing direction in multiple columns. Therefore, the amount of ink discharged from some of the nozzles may be larger than a predetermined value due to, for example, manufacturing errors, or a variation in the discharge amount may occur in the same nozzle due to the residual quantity of ink or the viscosity thereof. As a result, dots having a predetermined size are not formed, which causes a defect in printing, which is called a 'density irregularity'.

Therefore, in order to prevent the 'density irregularity', researches on hardware have been made to improve a technique for manufacturing the printing head or ink and to improve the design thereof. However, it is difficult to provide a printing head or ink having a low manufacturing cost and a high printing quality, but not generating the 'density irregularity' at all.

Thus, a technique for reducing the 'density irregularity' by improving software, such as the following printing control, in addition to by improving hardware has been proposed.

For example, JP-A-3-162977 discloses a method in which a density irregularity correcting unit corrects the density irregularity of a recording head with respect to a predetermined grayscale characteristic and a grayscale correcting unit corrects the grayscale characteristics of a predetermined unit of image recording elements of the recording head to absorb a variation in the amount of ink discharged from the recording head, thereby correcting the density irregularity.

However, in the method disclosed in JP-A-3-162977, each printer holds correction data (density irregularity table) of each of the image recording elements of the recording head. Therefore, the method has a problem in that it is difficult to use the optimum correction data coping with a variation in the characteristics of each printer, such as the deterioration of the printer with time.

Further, in order for each printer to hold the correction data, the printer needs to have a memory (a storage device) with a large capacity. In addition, in order to select the correction data most suitable for the deterioration of the printer with time, a large amount of information processing capacity (CPU power) is needed.

Accordingly, it is necessary to install a service system which manages the correction data for printing and provides correction data suitable for each printer, if necessary. However, in order to establish such a service system as a business, a system for performing a billing process for the service, such as a process of calculating a charge for the service and of notifying the charge, should be simultaneously developed with the service system.

SUMMARY

An advantage of some aspects of the invention is that it provides a printing system, a printing program, a printing method, a server apparatus, a printer, and a recording medium having the program stored therein capable of smoothly performing a billing process on a service for providing correction data to a client apparatus.

Further, another advantage of some aspects of the invention is that it provides a printing system, a printing program, a printing method, a server apparatus, a printer, and a recording medium having the program stored therein, capable of rapidly providing, to each printer, correction data most suitable for characteristics of the printer.

According to a first aspect of the invention, a printing system includes a client apparatus which deals with printing data; and a server apparatus which is connected to the client apparatus so as to communicate therewith. The client apparatus includes: a correction data request transmitting unit which requests the server apparatus to transmit correction data used for correcting the printing data; a correction data receiving unit which receives predetermined correction data transmitted from the server apparatus at the request of the correction data request transmitting unit; a billing information receiving unit which receives billing information on the correction data received by the correction data receiving unit; and a billing unit which performs a predetermined process on the basis of the billing information received by the billing information receiving unit. The server apparatus includes: a correction data request receiving unit which receives the request to transmit the correction data from the client apparatus; a correction data acquiring unit which acquires, from a correction data storage unit, predetermined correction data corresponding to the request to transmit the correction data received by the correction data request receiving unit; a correction data transmitting unit which transmits, to the client apparatus, the correction data acquired by the correction data acquiring unit; a charge calculating unit which calculates a charge corresponding to a process of sending the correction data transmitted from the correction data transmitting unit; and a charge notifying unit which notifies the client apparatus of the charge calculated by the charge calculating unit.

In this way, each client apparatus can timely acquire the optimum correction data from the server apparatus, and the server apparatus for providing the correction data can calculate a charge required for the supply of the correction data and notify the client apparatus of the charge for the supply of the correction data.

As a result, the server apparatus can smoothly perform a billing process on the supply of the correction data to the client apparatus, and it is possible to establish the correction data supply service as a business.

Here, for example, a (inkjet-type) printer (a printing apparatus) is used as the 'client apparatus for dealing with the printing data'. However, the client apparatus is not limited to apparatuses having a printing function. For example, the client apparatus includes an information process apparatus, such as a personal computer (PC) capable of dealing with printing digital data, and a printer driver (software) operated under an operating system (OS) of a PC (this is similarly applied to the following aspects related to a 'printing system', a 'printing program', a 'printing method', a 'printing system program', a 'server apparatus', a 'server apparatus program', a 'printer', and a 'recording medium having the programs stored therein', and to the description of exemplary embodiments of the invention).

Further, any apparatus can be used as the 'server apparatus' as long as it can communicate with the client apparatus over, for example, a wire or wireless network. In addition, the server apparatus includes information process apparatuses, such as a personal computer (PC) and a workstation (this is similarly applied to the following aspects related to a 'printing system', a 'printing program', a 'printing method', a 'printing system program', a 'server apparatus', a 'server apparatus program', a 'printer', and a 'recording medium having the programs stored therein', and to the description of exemplary embodiments of the invention).

According to a second aspect of the invention, in the printing system according to the first aspect, preferably, the server apparatus further includes: a correction data modifying unit which modifies the correction data acquired by the correction data acquiring unit and transmits the modified correction data to the correction data transmitting unit; and a correction data accuracy calculating unit which calculates correction accuracy of the correction data modified by the correction data modifying unit. In addition, preferably, the charge calculating unit calculates the charge on the basis of the results of the calculation performed by the correction data accuracy calculating unit.

That is, when it is not suitable to provide the correction data acquired by the correction data acquiring unit to the client apparatus, the server apparatus suitably modifies the content of the correction data by using the correction data modifying unit. In general, a cost is required to modify the correction data, and the cost is reduced or raised in proportion to a modification ratio (the amount of modification).

Therefore, in this aspect, when the correction data is modified, the modification ratio is also considered to calculate a charge for the correction data, which makes it possible to calculate a reasonable charge and notify the charge to the client apparatus.

Further, 'calculating the accuracy of the correction data' means 'calculating the accuracy of the data modified by the correction data modifying unit'.

According to a third aspect of the invention, in the printing system according to the first and second aspects, preferably, the server apparatus further includes a service point calculating unit which calculates a service point on the basis of the request to transmit the correction data or information received from the client apparatus. In addition, preferably, the charge calculating unit of the server apparatus calculates the charge, on the basis of the results of the calculation performed by the correction data accuracy calculating unit and the service point calculated by the service point calculating unit.

In this way, for example, it is possible to reliably perform an additional service for discounting a portion of the charge according to the service point on the client apparatus that frequently uses the correction data.

Further, the 'service point' means a 'discount value or a discount rate for performing the service'.

According to a fourth aspect of the invention, in the printing system according to any one of the first to third aspects, preferably, the client apparatus further includes: a printing data acquiring unit which acquires printing data used for printing; a printing data correcting unit which corrects the printing data acquired by the printing data acquiring unit, on the basis of the correction data received by the correction data receiving unit; a printing unit which performs printing, on the basis of the printing data corrected by the printing data correcting unit; and a consumable ordering unit which places an order for a consumable used for the printing unit with the server apparatus. In addition, preferably, the server apparatus further includes: a consumable order receiving unit which receives an order from the consumable ordering unit; and a consumable delivery unit which deliveries a predetermined consumable to the client apparatus, on the basis of information on the order received by the consumable order receiving unit. Further, preferably, the charge calculating unit calculates a delivery charge corresponding to the delivery of the predetermined consumable to the client apparatus and notifies the delivery charge to the client apparatus.

In this way, the client apparatus can correct the printing data, on the basis of the correction data received by the server apparatus and perform printing. In addition, the client apparatus can place an order for consumables required for printing, such as printing sheets, ink, and toner.

Further, when a printing head and a printing unit are separated from a printer, serving as the client apparatus, it is possible to realize the functions thereof by using only a general-purpose information processing apparatus (an image processing apparatus), such as a personal computer. In this case, it is possible to realize the functions of the above-mentioned components by allowing a general-purpose computer system, such as a personal computer (PC), to execute software. In addition, for example, the printing head, the printing unit, and a cut-out portion may be provided in a printing apparatus.

Meanwhile, the server apparatus can rapidly deliver a predetermined consumable when receiving an order from the client apparatus. In addition, the server apparatus can calculate a delivery charge required for the delivery of the consumable and notify the delivery charge to the client apparatus.

As a result, the server apparatus can perform a process of delivering the consumable, a process of calculating the delivery charge of the consumable, and a notifying process in addition to the billing process for the correction data.

According to a fifth aspect of the invention, in the printing system according to the fourth aspect, preferably, the server apparatus further includes a service point calculating unit which calculates a service point on the basis of the request to transmit the correction data or information received from the client apparatus. In addition, preferably, the charge calculating unit of the server apparatus calculates the delivery charge, on the basis of the service point calculated by the service point calculating unit.

In this way, it is possible to reliably perform an additional service for discounting a portion of the charge according to the service point on the client apparatus that frequently uses the correction data.

According to a sixth aspect of the invention, there is provided a printing program which is used for a printing system including a client apparatus which deals with printing data and a server apparatus which is connected to the client apparatus so as to communicate therewith. The printing program allows a computer of the client apparatus to function as: a correction data request transmitting unit which requests the server apparatus to transmit correction data used for correcting the printing data; a correction data receiving unit which receives predetermined correction data transmitted from the server apparatus at the request of the correction data request transmitting unit; a billing information receiving unit which receives billing information on the correction data received by the correction data receiving unit; and a billing unit which performs a predetermined process on the basis of the billing information received by the billing information receiving unit. In addition, the printing program allows a computer of the server apparatus to function as: a correction data request receiving unit which receives a request to transmit the correction data from the client apparatus; a correction data acquiring unit which acquires, from a correction data storage unit, predetermined correction data corresponding to the request to transmit the correction data received by the correction data request receiving unit; a correction data transmitting unit which transmits, to the client apparatus, the correction data acquired by the correction data acquiring unit; a charge calculating unit which calculates a charge corresponding to a process of sending the correction data transmitted from the correction data transmitting unit; and a charge notifying unit which notifies the client apparatus of the charge calculated by the charge calculating unit.

In this way, similar to the first aspect, each client apparatus can timely acquire the optimum correction data from the server apparatus, and the server apparatus for providing the correction data can calculate a charge required for the supply of the correction data and notify the client apparatus of the charge for the supply of the correction data.

As a result, the server apparatus can smoothly perform a billing process on the supply of the correction data to the client apparatus, and it is possible to establish the correction data supply service as a business.

It is also possible for software to allow a general-purpose computer system, such as a personal computer, serving as the server apparatus, to function as the above-mentioned units. In addition, when a printer, such as an inkjet printer have come on the market, is used as the client apparatus, generally, the printer includes a computer system composed of a central processing unit (CPU), storage devices (RAM and ROM), and an input/output device. Therefore, it is possible for software to allow the computer system to function as the above-mentioned units of the client apparatus.

As a result, it is possible to economically and easily realize the functions of the above-mentioned units of the server apparatus and the client apparatus, as compared with a structure in which dedicated software is used to realize the functions of the units of the server apparatus and the client apparatus. In addition, it is possible to change or improve the functions of the units and easily upgrade the version of the program by reprogramming.

According to a seventh aspect of the invention, preferably, the printing program according to the sixth aspect allows the computer of the server apparatus to function as: a correction data modifying unit which modifies the correction data acquired by the correction data acquiring unit and transmits the modified correction data to the correction data transmitting unit; and a correction data accuracy calculating unit which calculates correction accuracy of the correction data modified by the correction data modifying unit. In addition, preferably, the charge calculating unit calculates the charge on the basis of the results of the calculation performed by the correction data accuracy calculating unit.

In this way, similar to the second aspect, the server apparatus can reliably calculate a charge on the basis of a modification ratio of correction data and transmit the calculated charge to the client apparatus.

In addition, similar to the sixth aspect, it is possible for software to allow a general-purpose computer system or a standard computer system provided in the existing printer to execute the functions of the above-mentioned units. Thus, it is possible to economically and easily realize the functions of the above-mentioned units of the server apparatus and the client apparatus, as compared with a structure in which dedicated software is used to realize the functions of the units of the server apparatus and the client apparatus. In addition, it is possible to change or improve the functions of the units and easily upgrade the version of the program by reprogramming.

According to an eighth aspect of the invention, preferably, the printing program according to the seventh aspect allows the computer of the server apparatus to function as a service point calculating unit which calculates a service point on the basis of the request to transmit the correction data or information received from the client apparatus. In addition, preferably, the charge calculating unit of the server apparatus calculates the charge, on the basis of the results of the calculation performed by the correction data accuracy calculating unit and the service point calculated by the service point calculating unit.

In this way, similar to the third aspect, it is possible to reliably perform an additional service for discounting a portion of the charge, on the basis of the service point, on the client apparatus that frequently uses the correction data.

Similar to the sixth aspect, it is possible for software to allow a general-purpose computer system or a standard computer system provided in the existing printer to execute the functions of the above-mentioned units. Thus, it is possible to economically and easily realize the functions of the above-mentioned units of the server apparatus and the client apparatus, as compared with the structure in which dedicated software is used to realize the functions of the units of the server apparatus and the client apparatus. In addition, it is possible to change or improve the functions of the units and easily upgrade the version of the program by reprogramming.

According to a ninth aspect of the invention, preferably, the printing program according to the eighth aspect allows a computer of the client apparatus to function as: a printing data acquiring unit which acquires printing data used for printing; a printing data correcting unit which corrects the printing data acquired by the printing data acquiring unit, on the basis of the correction data received by the correction data receiving unit; a printing unit which performs printing, on the basis of the printing data corrected by the printing data correcting unit; and a consumable ordering unit which places an order for a consumable used for the printing unit with the server apparatus. In addition, preferably, the printing program allows the computer of the server apparatus to function as: a consumable order receiving unit which receives an order from the consumable ordering unit; and a consumable delivery unit which deliveries a predetermined consumable to the client apparatus, on the basis of information on the order received by the consumable order receiving unit. Preferably, the charge calculating unit calculates a delivery charge corresponding to the delivery of the predetermined consumable to the client apparatus and notifies the delivery charge to the client apparatus.

In this way, similar to the fourth aspect, the server apparatus can perform a process of delivering the consumable, a process of calculating the delivery charge of the consumable, and a notifying process, in addition to the billing process for the correction data.

Similar to the sixth aspect, it is possible for software to allow a general-purpose computer system or a standard computer system provided in the existing printer to execute the functions of the above-mentioned units. Thus, it is possible to economically and easily realize the functions of the above-mentioned units of the server apparatus and the client apparatus, as compared with the structure in which dedicated software is used to realize the functions of the units of the server apparatus and the client apparatus. In addition, it is possible to change or improve the functions of the units and easily upgrade the version of the program by reprogramming.

According to a tenth aspect of the invention, preferably, the printing program according to the ninth aspect allows the computer of the server apparatus to function as a service point calculating unit which calculates a service point on the basis of the request to transmit the correction data or information received from the client apparatus. In addition, preferably, the charge calculating unit of the server apparatus calculates the delivery charge, on the basis of the service point calculated by the service point calculating unit.

In this way, similar to the fifth aspect, it is possible to reliably perform an additional service for discounting a portion of the charge, on the basis of the service point, on the client apparatus that frequently uses the correction data.

Similar to the sixth aspect, it is possible for software to allow a general-purpose computer system or a standard computer system-provided in the existing printer to execute the functions of the above-mentioned units. Thus, it is possible to economically and easily realize the functions of the above-mentioned units of the server apparatus and the client apparatus, as compared with the structure in which dedicated software is used to realize the functions of the units of the server apparatus and the client apparatus. In addition, it is possible to change or improve the functions of the units and easily upgrade the version of the program by reprogramming.

According to an eleventh aspect of the invention, there is provided a computer readable recording medium which has the printing program according to any one of the sixth to tenth aspects stored therein.

In this way, the printing program according to any one of the sixth to tenth aspects can be easily and reliably provided to consumers, such as users, through a computer readable recording medium, such as a CD-ROM, a DVD-ROM, an FD, or a semiconductor chip.

According to a twelfth aspect of the invention, there is provided a printing method that uses a client apparatus for dealing with printing data and a server apparatus connected to the client apparatus so as to communicate therewith. In the printing method, the client apparatus performs: requesting the server apparatus to transmit correction data used for correcting the printing data; receiving predetermined correction data transmitted from the server apparatus in response to the request to transmit the correction data; receiving billing information on the received correction data; and performing a predetermined billing process on the basis of the received billing information. The server apparatus performs: receiving the request to transmit the correction data from the client apparatus; acquiring predetermined correction data corresponding to the received request to transmit the correction data; transmitting the acquired correction data to the client apparatus; calculating a charge corresponding to a process of sending the transmitted correction data; and notifying the client apparatus of the calculated charge.

In this way, similar to the first aspect, each client apparatus can timely acquire the optimum correction data from the server apparatus, and the server apparatus for providing the correction data can calculate a charge required for the supply of the correction data and notify the client apparatus of the charge for the supply of the correction data.

As a result, the server apparatus can smoothly perform a billing process on the supply of the correction data to the client apparatus, and it is possible to establish the correction data supply service as a business.

According to a thirteenth aspect of the invention, preferably, in the printing method according to the twelfth aspect, the server apparatus further performs: modifying the correction data acquired by the correction data acquiring unit and transmitting the modified correction data to the correction data transmitting unit; and calculating correction accuracy of the modified correction data. Preferably, the charge is calculated on the basis of the results of the calculation performed by the correction data accuracy calculating unit.

In this way, similar to the second aspect, it is possible to reliably notify the client apparatus of the charge corresponding to a modification ratio of correction data.

According to a fourteenth aspect of the invention, in the printing method according to the thirteenth, preferably, the server apparatus further performs calculating a service point on the basis of the request to transmit the correction data or information received from the client apparatus. Preferably, in the calculating of the charge of the server apparatus, the charge is calculated, on the basis of the results of the calculation in the calculating of the correction data accuracy and the service point calculated in the calculating of the service point.

In this way, similar to the third aspect, it is possible to reliably perform an additional service for discounting a portion of the charge, on the basis of the service point, on the client apparatus that frequently uses the correction data.

According to a fifteenth aspect of the invention, in the printing method according to the fourteenth aspect, the client apparatus further performs: acquiring printing data used for printing; correcting the acquired printing data, on the basis of the correction data received in the receiving of the correction data; performs printing, on the basis of the corrected printing data; and placing an order for a consumable used for the printing unit with the server apparatus. Preferably, the server apparatus further performs: receiving the order from the client apparatus; and delivering a predetermined consumable to the client apparatus, on the basis of information on the order from the client apparatus. Preferably, in the calculating of the charge, a delivery charge corresponding to the delivery of the predetermined consumable to the client apparatus is calculated, and the delivery charge is notified to the client apparatus.

In this way, similar to the fourth aspect, it is possible to perform a process of delivering the consumable, a process of calculating the delivery charge of the consumable, and a notifying process, in addition to the billing process for the correction data.

According to a sixteenth aspect of the invention, in the printing method according to the fifteenth aspect, preferably, the server apparatus further performs calculating a service point on the basis of the request to transmit the correction data or information received from the client apparatus. Preferably, in the calculating of the charge of the server apparatus, the delivery charge is calculated, on the basis of the calculated service point.

In this way, similar to the fifth aspect, it is possible to reliably perform an additional service for discounting a portion of the charge, on the basis of the service point, on the client apparatus that frequently uses the correction data.

According to a seventeenth aspect of the invention, there is provided a server apparatus which is connected to a printer so as to communicate therewith, the printer correcting printing data on the basis of predetermined correction data to perform printing. The server apparatus includes: a correction data request receiving unit which receives a request to acquire the correction data transmitted from the printer; a correction data acquiring unit which acquires, from a correction data storage unit, predetermined correction data corresponding to the request to acquire the correction data received by the correction data request receiving unit; a correction data transmitting unit which transmits, to the printer, the correction data acquired by the correction data acquiring unit; a charge calculating unit which calculates a charge corresponding to a process of sending the correction data transmitted from the correction data transmitting unit; and a charge notifying unit which notifies the printer of the charge calculated by the charge calculating unit.

In this way, the server apparatus can reliably provide correction data requested by the client apparatus and also notify the client apparatus of a charge for the transmission of the correction data, which makes it possible to establish a correction data service system as a business.

According to an eighteenth aspect of the invention, preferably, the server apparatus according to the seventeenth aspect further includes: a correction data modifying unit which modifies the correction data acquired by the correction data acquiring unit and transmits the modified correction data to the correction data transmitting unit; and a correction data accuracy calculating unit which calculates correction accuracy of the correction data modified by the correction data modifying unit. Preferably, the charge calculating unit calculates the charge on the basis of the results of the calculation performed by the correction data accuracy calculating unit.

In this way, the server apparatus can reliably calculate a charge on the basis of a modification ratio of correction data and notify the calculated charge to the client apparatus.

According to a nineteenth aspect of the invention, preferably, the server apparatus according to the eighteenth aspect further includes a service point calculating unit which calculates a service point on the basis of the request to transmit the correction data or information received from the printer. In addition, preferably, the charge calculating unit of the server apparatus calculates the charge, on the basis of the results of the calculation performed by the correction data accuracy calculating unit and the service point calculated by the service point calculating unit.

In this way, the server apparatus can reliably perform an additional service for discounting a portion of the charge, on the basis of the service point, on the client apparatus that frequently uses the correction data.

According to twentieth aspect of the invention, a server apparatus program allows a computer of a server apparatus that is connected to a printer so as to communicate therewith, the printer correcting printing data on the basis of predetermined correction data to perform printing, to function as: a correction data request receiving unit which receives a request to acquire the correction data transmitted from the printer; a correction data acquiring unit which acquires, from a correction data storage unit, predetermined correction data corresponding to the request to acquire the correction data received by the correction data request receiving unit; a correction data transmitting unit which transmits, to the printer, the correction data acquired by the correction data acquiring unit; a charge calculating unit which calculates a charge corresponding to a process of sending the correction data transmitted from the correction data transmitting unit; and a charge notifying unit which notifies the printer of the charge calculated by the charge calculating unit.

In this way, similar to the seventeenth aspect, the server apparatus can reliably provide correction data requested by the client apparatus and also notify the client apparatus of a charge for the transmission of the correction data, which makes it possible to establish a correction data service system as a business.

Since software can allow a general-purpose computer system, such as a personal computer, to function as the above-mentioned units, it is possible to economically and easily realize the functions of the above-mentioned units of the server apparatus, as compared with a structure in which dedicated software is used to realize the functions of the units of the server apparatus. In addition, it is possible to change or improve the functions of the units and easily upgrade the version of the program by reprogramming.

According to a twenty-first aspect of the invention, preferably, the server apparatus program according to the twentieth aspect allows the computer to function as: a correction data modifying unit which modifies the correction data acquired by the correction data acquiring unit and transmits the modified correction data to the correction data transmitting unit; and a correction data accuracy calculating unit which calculates correction accuracy of the correction data modified by the correction data modifying unit. Preferably, the charge calculating unit calculates the charge on the basis of the results of the calculation performed by the correction data accuracy calculating unit.

In this way, similar to the eighteenth aspect, the server apparatus can reliably calculate a charge on the basis of a modification ratio of correction data and transmit the charge to the client apparatus.

According to a twenty-second aspect of the invention, preferably, the server apparatus program according to the twenty-first aspect allows the computer to function as a service point calculating unit which calculates a service point on the basis of the request to transmit the correction data or information received from the client apparatus. Preferably, the charge calculating unit of the server apparatus calculates the charge, on the basis of the results of the calculation performed by the correction data accuracy calculating unit and the service point calculated by the service point calculating unit.

In this way, similar to the nineteenth aspect, the server apparatus can reliably perform an additional service for discounting a portion of the charge, on the basis of the service point, on the client apparatus that frequently uses the correction data.

According to a twenty-third aspect of the invention, a computer readable recording medium has the server apparatus program according to the twenty-second aspect stored therein.

In this way, the server apparatus program according to any one of the twentieth to twenty-second aspects can be easily and reliably provided to consumers, such as users, through a computer readable recording medium, such as a CD-ROM, a DVD-ROM, an FD, or a semiconductor chip.

According to a twenty-fourth aspect of the invention, there is provided a printer connected to a server apparatus for providing correction data so as to communicate therewith. The printer includes: a printing data acquiring unit which acquires printing data used for printing; a correction data request transmitting unit which requests the server apparatus to transmit correction data used for correcting the printing data acquired by the printing data acquiring unit; a correction data receiving unit which receives predetermined correction data transmitted from the server apparatus at the request of the correction data request transmitting unit; a printing data correcting unit which corrects the printing data acquired by the printing data acquiring unit, on the basis of the correction data received by the correction data receiving unit; a printing unit which performs printing, on the basis of the printing data corrected by the printing data correcting unit; a billing information receiving unit which receives billing information on the correction data received by the correction data receiving unit; and a billing unit which performs a predetermined process on the basis of the billing information received by the billing information receiving unit.

In this way, the printer can correct the printing data on the basis of the correction data to print high-quality images without density irregularity. In addition, the printer can grasp a charge for the supply of the correction data and reliably perform a payment process on the charge.

According to a twenty-fifth aspect of the invention, a printer program allows a computer of a printer that is connected to a server apparatus for providing correction data so as to communicate therewith to function as: a printing data acquiring unit which acquires printing data used for printing; a correction data request transmitting unit which requests the server apparatus to transmit correction data used for correcting the printing data acquired by the printing data acquiring unit; a correction data receiving unit which receives predetermined correction data transmitted from the server apparatus at the request of the correction data request transmitting unit; a printing data correcting unit which corrects the printing data acquired by the printing data acquiring unit, on the basis of the correction data received by the correction data receiving unit; a printing unit which performs printing, on the basis of the printing data corrected by the printing data correcting unit; a billing information receiving unit which receives billing information on the correction data received by the correction data receiving unit; and a billing unit which performs a predetermined process on the basis of the billing information received by the billing information receiving unit.

According to this aspect, similar to the twenty-fourth aspect, the printer can correct the printing data on the basis of the correction data to print high-quality images without density irregularity. In addition, the printer can grasp a charge for the supply of the correction data and reliably perform a payment process on the charge.

In addition, since software can allow a standard computer system provided in the existing printer to function as the above-mentioned units, it is possible to economically and easily realize the functions of the above-mentioned units of the printer, as compared with a structure in which dedicated software is used to realize the functions of the units of the printer. In addition, it is possible to change or improve the functions of the units and easily upgrade the version of the program by reprogramming.

According to a twenty-sixth aspect of the invention, a computer readable recording medium has the printer program according to the twenty-fifth aspect stored therein.

In this way, the printer program according to the twenty-fifth aspect can be easily and reliably provided to consumers, such as users, through a computer readable recording medium, such as a CD-ROM, a DVD-ROM, an FD, or a semiconductor chip.

According to a twenty-seventh aspect of the invention, a printing system includes a client apparatus which deals with printing data; and a server apparatus which is connected to the client apparatus so as to communicate therewith. The client apparatus includes: a correction data request transmitting unit which requests the server apparatus to transmit correction data used for correcting the printing data; and a correction data receiving unit which receives predetermined correction data transmitted from the server apparatus at the request of the correction-data request transmitting unit. The server apparatus includes: a correction data request receiving unit which receives the request to transmit the correction data from the client apparatus; a correction data acquiring unit which acquires, from a correction data storage unit, predetermined correction data corresponding to the request to transmit the correction data received by the correction data request receiving unit; and a correction data transmitting unit which transmits, to the client apparatus, the correction data acquired by the correction data acquiring unit.

According to this aspect, each client apparatus can timely acquire from the server apparatus the correction data most suitable for the deterioration thereof with time whenever printing is performed.

As a result, for example, each client apparatus does not need to store a large mount of correction data, and thus a memory (a storage device) for storing the correction data is not needed. In addition, each client apparatus does not need to independently create correction data, which makes it possible to prevent each client apparatus from ineffectively processing information.

Here, for example, a (inkjet-type) printer (a printing apparatus) is used as the 'client apparatus for dealing with the printing data'. However, the client apparatus is not limited to apparatuses having a printing function. For example, the client apparatus includes an information process apparatus, such as a personal computer (PC) capable of dealing with printing digital data, and a printer driver (software) operated under an operating system (OS) of a PC (this is similarly applied to the following aspects related to a 'printing system', a 'printing system program', a 'printing method', a 'server apparatus', a 'server apparatus program', a 'printer', and a 'recording medium having the programs stored therein', and to the description of exemplary embodiments of the invention).

Further, any apparatus can be used as the 'server apparatus' as long as it can communicate with the client apparatus over, for example, a wire or wireless network. In addition, the server apparatus includes information process apparatuses, such as a personal computer (PC) and a workstation (this is similarly applied to the following aspects related to a 'printing system', a 'printing program', a 'printing method', a 'server apparatus', a 'server apparatus program', a 'printer', and a 'recording medium having the programs stored therein', and to the description of exemplary embodiments of the invention).

According to a twenty-eighth aspect of the invention, in the printing system according to the twenty-seventh aspect, preferably, the client apparatus further includes: a printing data acquiring unit which acquires printing data used for printing; a printing data correcting unit which corrects the printing data acquired by the printing data acquiring unit, on the basis of the correction data received by the correction data receiving unit; and a printing unit which performs printing, on the basis of the printing data corrected by the printing data correcting unit.

In this way, the client apparatus can correct the printing data acquired by the printing data acquiring unit, on the basis of the optimum correction data transmitted from the server apparatus, and perform printing on the basis of the corrected printing data.

As a result, even when a variation in the characteristics of a printing head occurs due to the deterioration thereof with time in the printing unit of the client apparatus, the printer can print high-quality images without density irregularity.

According to a twenty-ninth aspect of the invention, in the printing system according to the twenty-eighth aspect, preferably, the server apparatus further includes a correction data modifying unit which modifies the correction data acquired by the correction data acquiring unit, if necessary, and transmits the modified correction data to the correction data transmitting unit.

In this way, the server apparatus can generate the optimum correction data in consideration of the deterioration of the client apparatus with time and provide the correction data for the client apparatus.

According to a thirtieth aspect of the invention, in the printing system according to the twenty-ninth aspect, preferably, when the residual quantity of ink is smaller than a predetermined threshold value in the printing unit, the correction data modifying unit of the server apparatus transmits, to the correction data transmitting unit, the correction data acquired by the correction data acquiring unit without modification.

In this way, the correction data modifying unit of the server apparatus does not need to modify the correction data at all, which makes it possible to rapidly provide the correction data for the client apparatus.

According to a thirty-first aspect of the invention, in the printing system according to the thirtieth aspect, preferably, the correction data storage unit is provided in the server apparatus or another server apparatus connected to the server apparatus so as to communicate therewith.

That is, when the correction data storage unit is provided in the server apparatus, it is possible to rapidly process necessary correction data. When the correction data storage unit is provided in another server apparatus, it is possible to store a large amount of data and to reduce the storage capacity of the server apparatus.

According to a thirty-second aspect of the invention, in the printing system according to the thirty-first aspect, preferably, the correction data request transmitting unit of the client apparatus requests the server apparatus to transmit correction data used for correcting the printing data whenever the printing data acquiring unit acquires the printing data.

In this way, the client apparatus can always acquire the optimum correction data at the optimum timing.

According to a thirty-third aspect of the invention, there is provided a program for a printing system including a client apparatus which deals with printing data and a server apparatus which is connected to the client apparatus so as to communicate therewith. The program allows a computer of the client apparatus to function as: a printing data acquiring unit which acquires the printing data used for printing; a correction data request transmitting unit which requests the server apparatus to transmit correction data used for correcting the printing data acquired by the printing data acquiring unit; a correction data receiving unit which receives predetermined correction data transmitted from the server apparatus at the request of the correction data request transmitting unit; and a printing data correcting unit which corrects the printing data acquired by the printing data acquiring unit, on the basis of the correction data received by the correction data receiving unit. The program allows a computer of the server apparatus to function as: a correction data request receiving unit which receives the request to transmit the correction data from the client apparatus; a correction data acquiring unit which acquires, from a correction data storage unit, predetermined correction data corresponding to the request to transmit the correction data received by the correction data request receiving unit; and a correction data transmitting unit which transmits, to the client apparatus, the correction data acquired by the correction data acquiring unit.

In this way, similar to the twenty-seventh aspect, each client apparatus can timely acquire from the server apparatus the correction data most suitable for the deterioration thereof with time. As a result, a memory (a storage device) for storing the correction data is not needed, or each client apparatus does not need to independently create correction data.

Further, it is possible to use a general-purpose computer system, such as a personal computer, as the server apparatus. When a printer, such as an inkjet printer have come on the market, is used as the client apparatus, generally, the printer includes a computer system composed of, for example, a central processing unit (CPU), storage devices (RAM and ROM), and an input/output device.

Therefore, it is possible for software to allow the computer system to function as the above-mentioned units of the printing system. As a result, it is possible to economically and easily realize the functions of the above-mentioned units of the computer system, as compared with a structure in which dedicated software is used to realize the functions of the units of the computer system. In addition, it is possible to change or improve the functions of the units and easily upgrade the version of the program by reprogramming.

According to a thirty-fourth aspect of the invention, preferably, the printing system program according to the thirty-third aspect allows the computer of the client apparatus to function as: a printing data acquiring unit which acquires printing data used for printing; a printing data correcting unit which corrects the printing data acquired by the printing data acquiring unit, on the basis of the correction data received by the correction data receiving unit; and a printing unit which performs printing, on the basis of the printing data corrected by the printing data correcting unit.

In this way, similar to the twenty-eight aspect, even when a variation in the characteristics of a printing head occurs due to the deterioration thereof with time in the printing unit of the client apparatus, the printer can print high-quality images without density irregularity.

Similar to the thirty-third aspect, it is possible for software to allow a computer system of a personal computer or a printer to function as the above-mentioned units of the printing system. As a result, it is possible to economically and easily realize the functions of the above-mentioned units of the computer system, as compared with a structure in which dedicated software is used to realize the functions of the units of the computer system. In addition, it is possible to change or improve the functions of the units and easily upgrade the version of the program by reprogramming.

According to a thirty-fifth aspect of the invention, preferably, the printing system program according to the thirty-fourth aspect allows the computer of the server apparatus to function as a correction data modifying unit which modifies the correction data acquired by the correction data acquiring unit, if necessary, and transmits the modified correction data to the correction data transmitting unit.

In this way, similar to the twenty-ninth aspect, the server apparatus can generate the optimum correction data in consideration of the deterioration of the client apparatus with time and provide the correction data for the client apparatus.

Similar to the thirty-third aspect, it is possible for software to allow a computer system of a personal computer or a printer to function as the above-mentioned units of the printing system. As a result, it is possible to economically and easily realize the functions of the above-mentioned units of the computer system, as compared with a structure in which dedicated software is used to realize the units of the computer system. In addition, it is possible to change or improve the functions of the units and easily upgrade the version of the program by reprogramming.

According to a thirty-sixth aspect of the invention, in the printing system program according to the thirty-fifth aspect, preferably, when the residual quantity of ink is smaller than a predetermined threshold value in the printing unit, the correction data modifying unit of the server apparatus transmits, to the correction data transmitting unit, the correction data acquired by the correction data acquiring unit without modification.

In this way, similar to the thirtieth aspect, the correction data modifying unit of the server apparatus does not need to modify the correction data at all, which makes it possible to rapidly provide the correction data for the client apparatus.

Similar to the thirty-third aspect, it is possible for software to allow a computer system of a personal computer or a printer to function as the above-mentioned units of the printing system. As a result, it is possible to economically and easily realize the functions of the above-mentioned units of the computer system, as compared with a structure in which dedicated software is used to realize the functions of the units of the computer system. In addition, it is possible to change or improve the functions of the units and easily upgrade the version of the program by reprogramming.

According to a thirty-seventh aspect of the invention, in the printing system program according to the thirty-sixth aspect, preferably, the correction data storage unit is provided in the server apparatus or another server apparatus connected to the server apparatus so as to communicate therewith.

In this way, similar to the thirty-first aspect, when the correction data storage unit is provided in the server apparatus, it is possible to rapidly process necessary correction data. When the correction data storage unit is provided in another server apparatus, it is possible to store a large amount of data and thus reduce the storage capacity of the server apparatus.

Further, similar to the thirty-third aspect, it is possible for software to allow a computer system of a personal computer or a printer to function as the above-mentioned units. As a result, it is possible to economically and easily realize the functions of the above-mentioned units of the computer system, as compared with a structure in which dedicated software is used to realize the functions of the units of the computer system. In addition, it is possible to change or improve the functions of the units and easily upgrade the version of the program by reprogramming.

According to a thirty-eighth aspect of the invention, in the printing system program according to the thirty-seventh aspect, preferably, the correction data request transmitting unit of the client apparatus requests the server apparatus to transmit correction data used for correcting the printing data whenever the printing data acquiring unit acquires the printing data.

In this way, similar to the thirty-second aspect, the client apparatus can always acquire the optimum correction data at the optimum timing.

Further, similar to the thirty-third aspect, it is possible for software to allow a computer system of a personal computer or a printer to function as the above-mentioned units. As a result, it is possible to economically and easily realize the functions of the above-mentioned units of the computer system, as compared with a structure in which dedicated software is used to realize the functions of the units of the computer system. In addition, it is possible to change or improve the functions of the units and easily upgrade the version of the program by reprogramming.

According to a thirty-ninth aspect of the invention, a computer readable recording medium has the printing system program according to the thirty-seventh aspect stored therein.

In this way, the printing system program according to the thirty-seventh aspect can be easily and reliably provided to consumers, such as users, through a computer readable recording medium, such as a CD-ROM, a DVD-ROM, an FD, or a semiconductor chip.

According to a fortieth aspect of the invention, there is provided a printing method that uses a client apparatus for dealing with printing data and a server apparatus connected to the client apparatus so as to communicate therewith. In the printing method, the client apparatus performs: acquiring the printing data used for printing; requesting the server apparatus to transmit correction data used for correcting the acquired printing data; receiving predetermined correction data transmitted from the server apparatus in response to the request to transmit the correction data; and correcting the acquired printing data, on the basis of the received correction data. In addition, the server apparatus performs: receiving the request to transmit the correction data from the client apparatus; acquiring, from a correction data storage unit, predetermined correction data corresponding to the received request to transmit the correction data; and transmitting the acquired correction data to the client apparatus.

In this way, similar to the first aspect, each client apparatus can timely acquire from the server apparatus the correction data most suitable for the deterioration thereof with time. Therefore, a memory (a storage device) for storing the correction data is not needed. In addition, each client apparatus does not need to independently create correction data.

According to a forty-first aspect of the invention, in the printing method according to the fortieth aspect, preferably, the client apparatus further performs: correcting the acquired printing data, on the basis of the received correction data; and performing printing, on the basis of the corrected printing data.

In this way, similar to the twenty-eighth aspect, even when a variation in the characteristics of a printing head occurs due to the deterioration thereof with time in the printing unit of the client apparatus, it is possible to print high-quality images without density irregularity.

According to a forty-second aspect of the invention, in the printing method according to the forty-first aspect, preferably, the server apparatus further performs modifying the acquired correction data, if necessary, to transmit the modified correction data to the correction data transmitting unit.

In this way, similar to the twenty-ninth aspect, the server apparatus can generate the optimum correction data in consideration of the deterioration of the client apparatus with time and provide the correction data for the client apparatus.

According to a forty-third aspect of the invention, in the printing method according to the forty-second aspect, preferably, in the modifying of the correction data performed by the server apparatus, when the residual quantity of ink is smaller than a predetermined threshold value in the printing, the acquired correction data is transmitted to the correction data transmitting unit without modification.

In this way, similar to the thirtieth aspect, in the modifying of the correction data performed by the server apparatus, the correction data is not modified at all, which makes it possible to rapidly provide the correction data for the client apparatus.

According to a forty-fourth aspect of the invention, in the printing method according to the forty-third aspect, preferably, the correction data storage unit is provided in the server apparatus or another server apparatus connected to the server apparatus so as to communicate therewith.

In this way, similar to the fifth aspect, when the correction data storage unit is provided in the server apparatus, it is possible to rapidly process necessary correction data. When the correction data storage unit is provided in another server apparatus, it is possible to store a large amount of data and thus reduce the storage capacity of the server apparatus.

According to a forty-fifth aspect of the invention, in the printing method according to the forty-fourth aspect, preferably, in the transmitting of the request to transmit the correction data performed by the client apparatus, the request to transmit the correction data used for correcting the printing data is transmitted to the server apparatus whenever the printing data is acquired.

In this way, similar to the thirty-second aspect, the client apparatus can acquire the optimum correction data at the optimum timing.

According to a forty-sixth aspect of the invention, there is provided a server apparatus which is connected to a printer for correcting printing data, on the basis of predetermined correction data, to perform printing. The server apparatus includes: a correction data request receiving unit which receives a request to transmit the correction data from the printer; a correction data acquiring unit which acquires, from a correction data storage unit, predetermined correction data corresponding to the request to transmit the correction data received by the correction data request receiving unit; and a correction data transmitting unit which transmits, to the printer, the correction data acquired by the correction data acquiring unit.

In this way, when receiving the request to transmit the correction data from the printer, the server apparatus acquires, from the correction data storage unit, predetermined correction data corresponding to the request to transmit the correction data, and transmits the correction data to the printer. Therefore, the server apparatus can reliably provide the correction data requested by the printer.

According to a forty-seventh aspect of the invention, preferably, the server apparatus according to the forty-sixth aspect further includes a correction data modifying unit which modifies the correction data acquired by the correction data acquiring unit, if necessary, and transmits the modified correction data to the correction data transmitting unit. In this way, the server apparatus can reliably provide, to the client apparatus, the correction data most suitable for the conditions of the client apparatus.

According to a forty-eighth aspect of the invention, in the server apparatus according to the forty-seventh aspect, preferably, when the residual quantity of ink is smaller than a predetermined threshold value in the printer, the correction data modifying unit transmits, to the correction data transmitting unit, the correction data acquired by the correction data acquiring unit without modification.

In this way, since the correction data does not need to be modified at all, the server apparatus can rapidly provide, to the client apparatus, the correction data requested by the client apparatus.

According to a forty-ninth aspect of the invention, a server apparatus program allows a computer of a server apparatus that is connected to a printer so as to communicate therewith, the printer correcting printing data on the basis of predetermined correction data to perform printing, to function as: a correction data request receiving unit which receives a request to transmit the correction data from the printer; a correction data acquiring unit which acquires, from a correction data storage unit, predetermined correction data corresponding to the request to transmit the correction data received by the correction data request receiving unit; and a correction data transmitting unit which transmits, to the printer, the correction data acquired by the correction data acquiring unit.

In this way, similar to the forty-sixth aspect, when receiving the request to transmit the correction data from the printer, the server apparatus acquires, from the correction data storage unit, predetermined correction data corresponding to the request to transmit the correction data, and transmits the correction data to the printer. Therefore, the server apparatus can reliably provide the correction data requested by the printer.

In addition, software allows a general-purpose computer system, such as a personal computer or a workstation, to function as the above-mentioned unit. Therefore, it is possible to economically and easily realize the functions of the above-mentioned units, as compared with a structure in which dedicated software is used to realize the functions of the units.

According to a fiftieth aspect of the invention, preferably, the server apparatus program according to the forty-ninth aspect allows the computer of the server apparatus to function as a correction data modifying unit which modifies the correction data acquired by the correction data acquiring unit, if necessary, and transmits the modified correction data to the correction data transmitting unit.

In this way, similar to the forty-seventh aspect, the server apparatus can reliably provide, to the client apparatus, the correction data suitable for the conditions of the client apparatus.

According to a fifty-first aspect of the invention, in the server apparatus program according to the fiftieth aspect, preferably, when the residual quantity of ink is smaller than a predetermined threshold value in the printer, the correction data modifying unit transmits, to the correction data transmitting unit, the correction data acquired by the correction data acquiring unit without modification.

In this way, similar to the forty-eighth aspect, since the correction data does not need to be modified at all, the server apparatus can rapidly provide, to the client apparatus, the correction data requested by the client apparatus.

Similar to the forty-ninth aspect, software allows a general-purpose computer system, such as a personal computer or a workstation, to function as the above-mentioned units. Therefore, it is possible to economically and easily realize the functions of the above-mentioned units, as compared with a structure in which dedicated software is used to realize the functions of the units.

According to a fifty-second aspect of the invention, a computer readable recording medium has the server apparatus program according to any one of the forty-ninth to fifty-first aspects stored therein.

In this way, the server apparatus program according to any one of the forty-ninth to fifty-first aspects can be easily and reliably provided to consumers, such as users, through a computer readable recording medium, such as a CD-ROM, a DVD-ROM, an FD, or a semiconductor chip.

According to a fifty-third aspect of the invention, there is provided a printer which is connected to a server apparatus for providing correction data so as to communicate therewith. The printer includes: a printing data acquiring unit which acquires the printing data used for printing; a correction data request transmitting unit which requests the server apparatus to transmit correction data used for correcting the printing data acquired by the printing data acquiring unit; a correction data receiving unit which receives predetermined correction data transmitted from the server apparatus at the request of the correction data request transmitting unit; a printing data correcting unit which corrects the printing data acquired by the printing data acquiring unit, on the basis of the correction data received by the correction data receiving unit; and a printing unit which performs printing, on the basis of the printing data corrected by the printing data correcting unit.

In this way, when acquiring the printing data used for printing, the printer can acquire from the server apparatus the correction data most suitable for the conditions of the printer by only requesting the server apparatus to transmit the correction data used for correcting the printing data. As a result, the printer can print high-quality images without density irregularity by using the printing data.

According to a fifty-fourth aspect of the invention, in the printer according to the fifty-third aspect, preferably, whenever the printing data acquiring unit acquires printing data, the correction data request transmitting unit requests the server apparatus to transmit the correction data used for correcting the printing data.

In this way, the printer can acquire the optimum correction data at the optimum timing.

According to a fifty-fifth aspect of the invention, a printer program allows a computer of a printer connected to a server apparatus for providing correction data so as to communicate therewith to function as: a printing data acquiring unit which acquires the printing data used for printing; a correction data request transmitting unit which requests the server apparatus to transmit correction data used for correcting the printing data acquired by the printing data acquiring unit; a correction data receiving unit which receives predetermined correction data transmitted from the server apparatus at the request of the correction data request transmitting unit; a printing data correcting unit which corrects the printing data acquired by the printing data acquiring unit, on the basis of the correction data received by the correction data receiving unit; and a printing unit which performs printing, on the basis of the printing data corrected by the printing data correcting unit.

In this way, similar to the twenty-eighth aspect, the printer can acquire from the server apparatus the correction data most suitable for the conditions of the printer. Therefore, the printer can print high-quality images without density irregularity by using the printing data.

Since a standard computer system provided in the existing printer can be used without any change, it is possible to economically and easily realize the functions of the above-mentioned units of the printer, as compared with the structure in which dedicated software is used to realize the functions of the units of the printer.

According to a fifty-sixth aspect of the invention, in the printer program according to the fifty-fifth aspect, preferably, whenever the printing data acquiring unit acquires printing data, the correction data request transmitting unit requests the server apparatus to transmit the correction data used for correcting the printing data.

In this way, similar to the fifty-fourth aspect, the printer can acquire the optimum correction data at the optimum timing.

Similar to the fifty-fifth aspect, since a standard computer system provided in the existing printer can be used without any change, it is possible to economically and easily realize the functions of the above-mentioned units of the printer, as compared with the structure in which dedicated software is used to realize the functions of the units of the printer.

According to a fifth-seventh aspect of the invention, a computer readable recording medium has the printer program according to the fifty-fifth or fifty-sixth aspect stored therein.

In this way, the printing program according to the fifty-fifth or fifty-sixth aspect can be easily and reliably provided to consumers, such as users, through a computer readable recording medium, such as a CD-ROM, a DVD-ROM, an FD, or a semiconductor chip.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings.

FIGS. 1 to 12 are diagrams illustrating a printing system 100, a printing system program, a printing method, a server apparatus, a server apparatus program, a printer, a printer program, and a computer readable recording medium having the programs stored therein according to a first embodiment of the invention.

Figure 1:
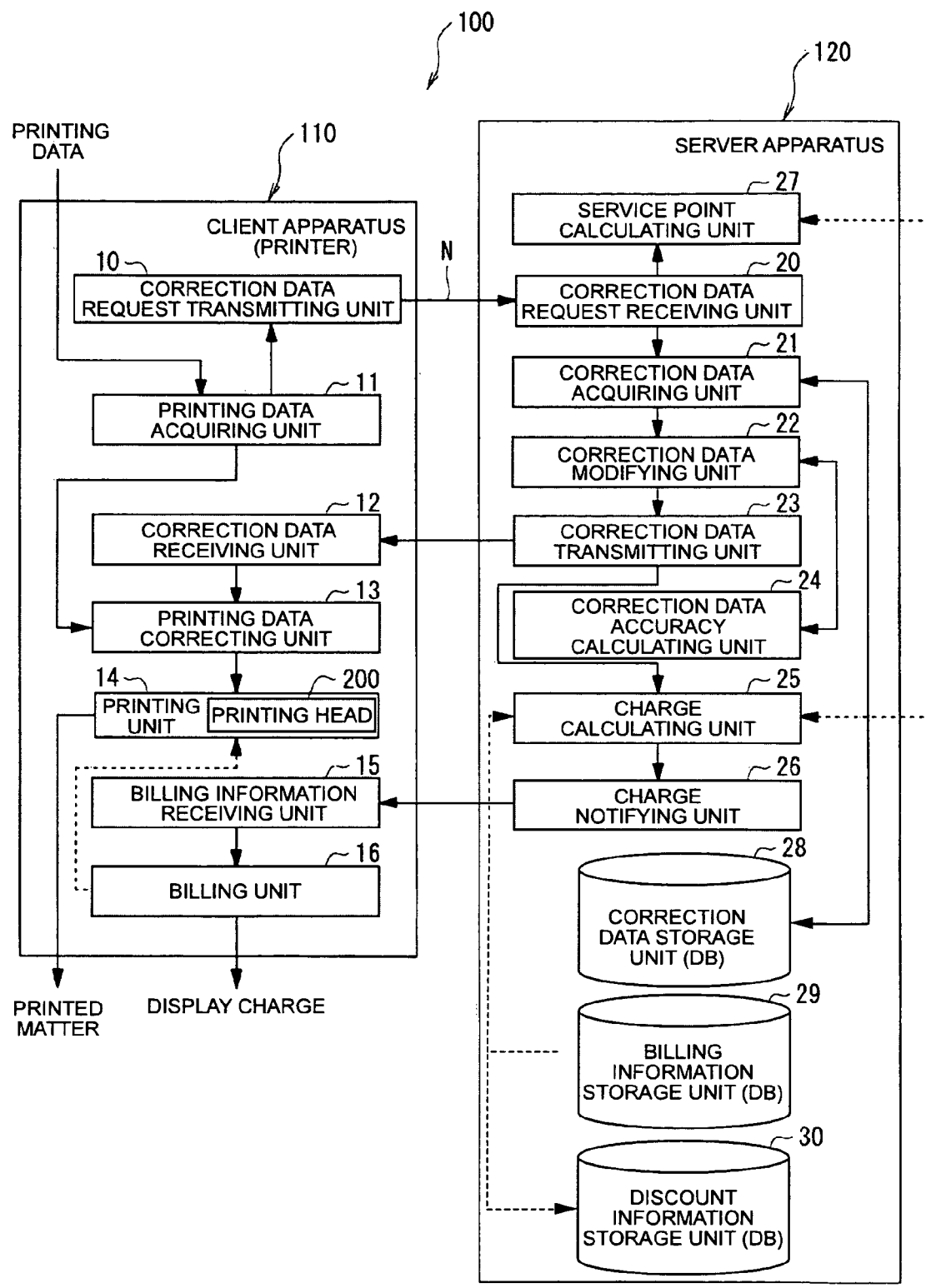
FIG. 1 is a functional block diagram illustrating a printing system according to the invention.

FIG. 1 is a functional block diagram illustrating the printing system 100 according to the first embodiment of the invention.

As shown in FIG. 1, in the printing system 100, one or more printers (client apparatuses) 110 and server apparatuses 120 are connected to each other over wire/wireless networks N including a wide area network (WAN), such as the Internet, and a local area network (LAN), such as the Ethernet (registered trademark) such that they can communicate with each other.

Further, the printer 110 includes, as main components, a correction data request transmitting unit 10, a printing data acquiring unit 11, a correction data receiving unit 12, a printing data correcting unit 13, a printing unit 14, a billing information receiving unit 15, and a billing unit 16. Hereinafter, the functions of these components will be described in detail.

First, the correction data receiving unit 10 transmits, to the server apparatus 120, printer information of the printer 110 and a request to transmit correction data used for correcting printing data that is acquired by the printing data acquiring unit 11 over the network N.

Here, the 'printer information' transmitted together with the request to transmit the correction data includes status information, such as a printer ID (including a serial number) for specifying a printer (a client apparatus), which is a source of the information, characteristics of a printing head, the type of ink, the residual quantity of ink, an average temperature in an installed place, an average humidity in an installed place, the number of continuously printed sheets, and the average number of printed sheets (per day). However, the printer information is not limited thereto.

The printing data acquiring unit 11 has a function of acquiring printing data used for actual printing in the printing unit 14, which will be described later, from a printing instruction apparatus (a printing data generating apparatus), such as a personal computer, which is an external apparatus. In addition, the printing data acquiring unit 11 has a function of acquiring multiple-valued image data and of generating printing data from the multiple-valued image data, if necessary. Here, the term 'printing data' means information related to the size or color of a dot corresponding to each pixel of the original image data. For example, in the printing data composed of multiple-valued color image data, when the color image data is image data in which RGB data having a multi-grayscale level (the grayscale level (the value of brightness) of each color (R, G, and B) for one pixel) is represented in 8 bits and at 256 levels (0 to 255 levels), the RGB data are converted into multiple-valued CMYK data (in case of four colors) corresponding to each ink of the printing head 200 of the printing unit 18, which will be described later. Then, as shown in FIG. 4, data for each color is converted into N values, and a dot having a size corresponding to the N value is assigned.

Figure 4:
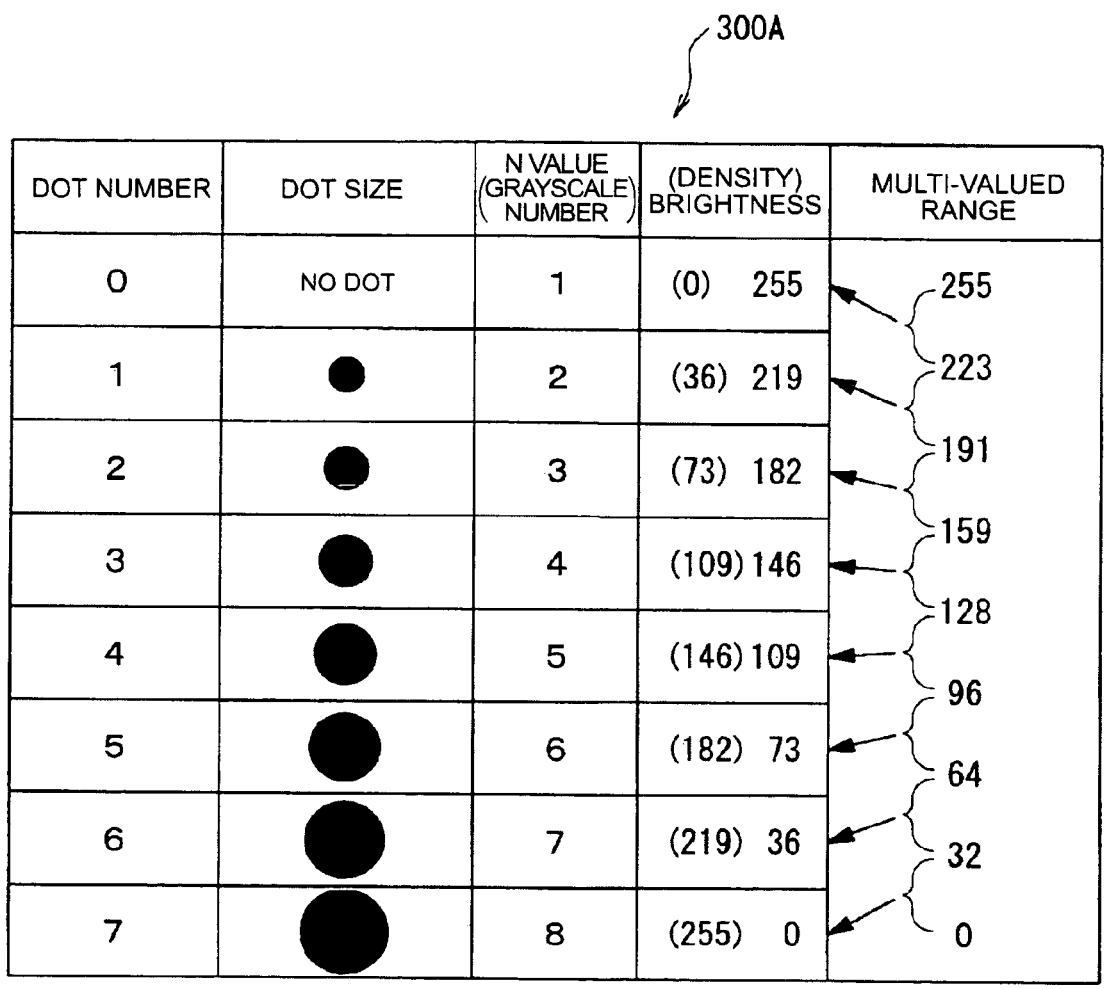
FIG. 4 is a diagram illustrating an example of a dot/density conversion table indicating the relationship between a pixel value and a grayscale value (an N value), and the relationship between the grayscale value and a dot size.

FIG. 4 shows an example of a dot/density conversion table 300A for generating printing data from the image data having a multi-grayscale level.

As shown in the right field of FIG. 4, the values (density values) of pixels of the image data, which is source printing data, are represented in 8 bits and at 256 grayscale levels. When the values are divided into 8-level values such that 8 grayscale numbers (N) are obtained, the pixel values are classified into 8 levels by using 7 threshold values, as shown in FIG. 4.

That is, as shown in the dot/density conversion table 300A, when the values (the value of brightness) of pixels of multiple-valued image data are specified in 8 bits (0 to 255), 7 threshold values, '32', '64', '96', '128', '159', '191', and '223' are used to classify the pixel values into 8 levels as follows: when the pixel value is in the range of '255 to 223', N=1 (a density value: '0'); when the pixel value is in the range of '222 to 191', N=2 (a density value: '36'); when the pixel value is in the range of '190 to 159', N=3 (a density value: '73'); when the pixel value is in the range of '158 to 128', N=4 (a density value: '109'); when the pixel value is in the range of '127 to 96', N=5 (a density value: '146'); when the pixel value is in the range of '95 to 64', N=6 (a density value: '182'); when the pixel value is in the range of '63 to 32', N=7 (a density value: '219'); and when the pixel value is in the range of '31 to 0', N=8 (a density value: '255').

Further, as shown in the left field of FIG. 4, dots are set to correspond to the pixels having N values to generate the printing data.

In FIG. 4, in a case in which 8 grayscale numbers (N=8) are used and 'density values' are selected as the pixel values, when N=1, the size of the dot is converted into 'no dot'. When N=2, the size of the dot is converted into 'a small dot' having a minimum dot area. When N=3, the size of the dot is converted into 'a medium dot' having an area slightly larger than that of the small dot. When N=8, the size of the dot is converted into 'a large dot' having a maximum dot area. In addition, when 'brightness values' are used as the pixel values, the sizes of the dots are converted in inverse relation to the 'density values'.

The correction data receiving unit 12 has a function of receiving predetermined correction data transmitted from the server apparatus 120 in response to a correction data transmitting request from the correction data request transmitting unit 10.

Here, the 'correction data' means data used for correcting the content of the printing data corresponding to a variation in the characteristics of the printing head 200, in order to prevent the deterioration of a printing quality due to the variation in the characteristics of the printing head 200 of the printing unit 18 caused by, for example, a change with time or a change in status. However, the correction data is not limited to the above-mentioned data. A detailed example thereof will be described later.

The printing data correcting unit 13 has a function of correcting the printing data acquired by the printing data acquiring unit 12, on the basis of the correction data received by the correction data receiving unit 14.

That is, as will be described in detail, it has been known that the characteristics of the printing head 200 of the printing unit 14, particularly, nozzle characteristics are not uniform, but are changed due to a variation in status with time, for example, according to the residual quantity of ink. For example, when the printing head 200 of the printing unit 14 forms dots by an inkjet method, the viscosity of ink is changed due to factors, such as the residual quantity thereof, the passage of time, and ambient temperature, which causes the size of a dot to be formed to differ from that corresponding to the original pixel value. In addition, as will be described in detail, different amounts of ink may be discharged from nozzle holes having the same diameter according to the positions of dots to be formed, which makes it difficult to obtain dots having a desired size.

Therefore, when the characteristics of the printing head 200 are changed due to the above-mentioned factor, the printing data correcting unit 16 corrects a portion of or all the content of the original printing data corresponding to the change in characteristics, on the basis of the correction data acquired by the correction data receiving unit 12.

For example, when it is determined by the received correction data that a dot printed by a nozzle of the printing head 200 is one size larger than a dot prescribed by the printing data, the dot printed by the nozzle is controlled to be one size smaller than that defined by the printing data.

In this way, even when the characteristics of the printing head 200 are changed, the change in characteristics are absorbed (offset), which makes it possible to obtain a high-quality printed matter which is fully reproduced by the original printing data.

The printing unit 14 includes the printing head 200 of an inkjet type and has a function of performing printing, on the basis of the printing data corrected by the printing data correcting unit 16, by using the printing head 200.

Figure 6:
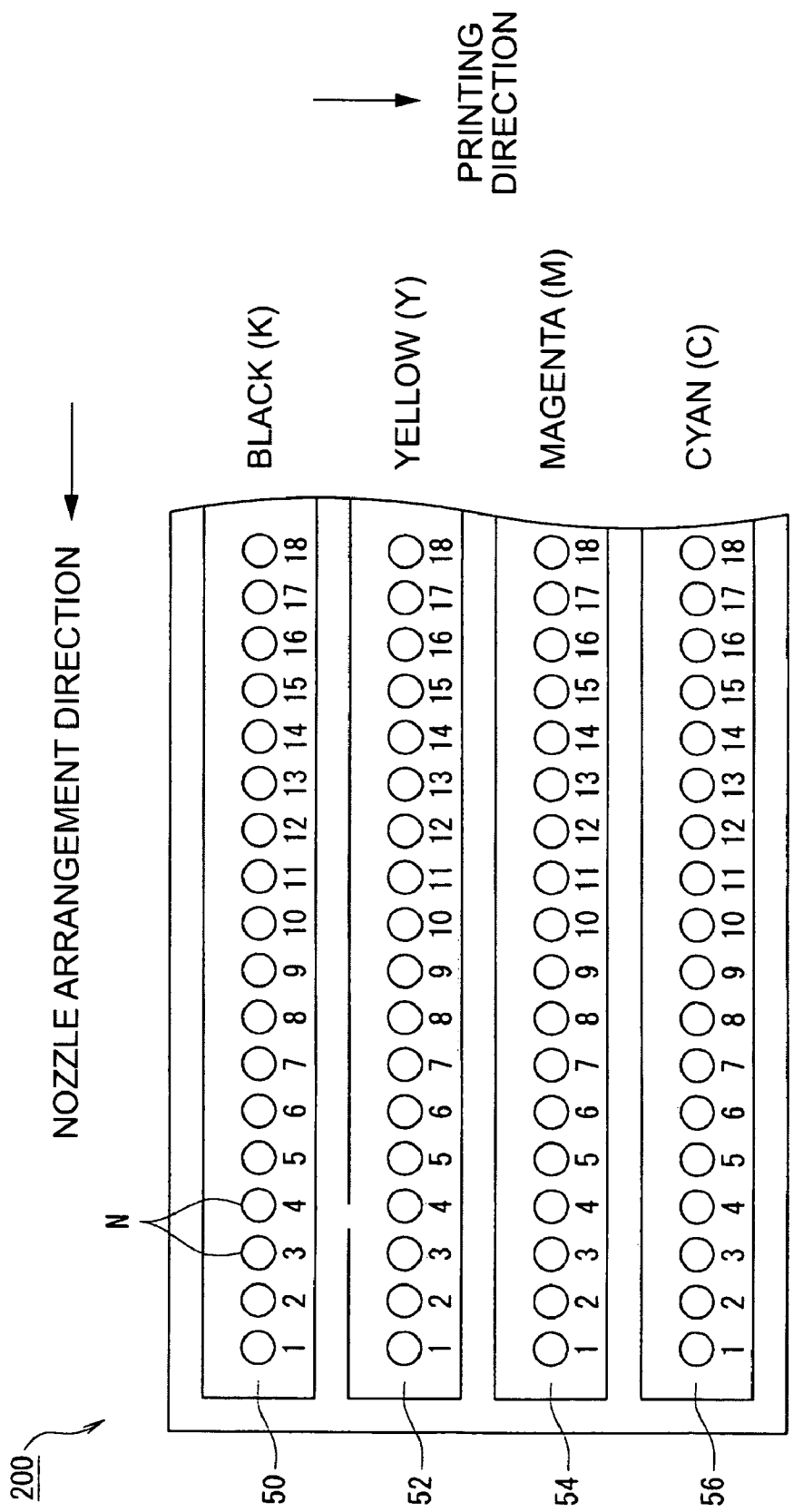
FIG. 6 is a partial enlarged bottom view illustrating the structure of a printing head.
Figure 7:
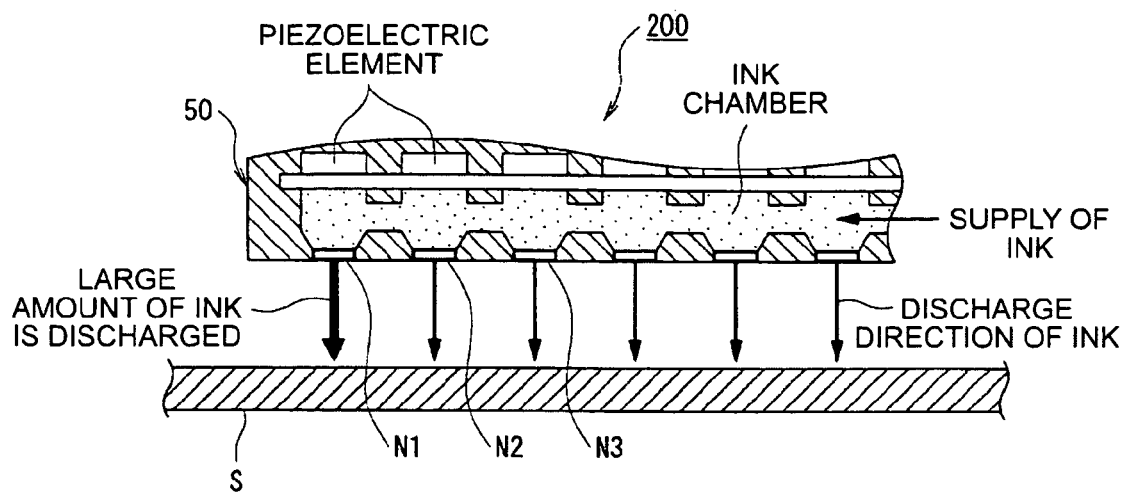
FIG. 7 is a partial enlarged side view illustrating the structure of the printing head shown in FIG. 6.

That is, as shown in FIGS. 6 and 7, the printing unit 14 is an inkjet printer that jets ink onto a printing medium (sheet) S in the shape of a dot from nozzle modules 50, 51, 52, 53, 54, and 55 formed in the printing head 200, while moving one of or both the printing medium S and the printing head 200, to form an image composed of a plurality of dots on the printing medium S. The printing unit 14 includes well-known components, such as a printing head transfer mechanism (not shown) for reciprocating the printing head 200 on the printing medium S in the direction of the width of the printing medium S (in the case of a multi-pass printing type), a sheet transfer mechanism (not shown) for moving the printing medium S, and a printing head control mechanism (not shown) for controlling the discharge of ink from the printing head 200 on the basis of the printing data, in addition to the printing head 200.

FIG. 6 is a partial enlarged bottom view illustrating the structure of the printing head 200. FIG. 7 is a partial enlarged cross-sectional view of the printing head shown in FIG. 6.

As shown in FIG. 6, the printing head 200 has an elongated structure extending in the width direction of a printing sheet used for a so-called line head type printer, and includes four (four colors) nozzle modules, that is, a black nozzle modules 50, a yellow nozzle module 52, a magenta nozzle module 54, and a cyan nozzle module 56, which are integrally arranged so as to overlap each other in the printing direction (the sub-scanning direction). The black nozzle module 50 has a plurality of nozzles N (18 nozzles in FIG. 6), each discharging only a black (K) ink, which are linearly arranged in a main scanning direction. The yellow nozzle module 52 has a plurality of nozzles N, each discharging only a yellow (Y) ink, which are linearly arranged in the main scanning direction. The magenta nozzle module 54 has a plurality of nozzles N, each discharging only a magenta (M) ink, which are linearly arranged in the main scanning direction. The cyan nozzle module 56 has a plurality of nozzles N, each discharging only a cyan (C) ink, which are linearly arranged in the main scanning direction. In addition, when a printing head is of a monochromatic printing type, only the black nozzle module 50 is provided. When a printing head is used for printing a high-quality image, the printing head may further include a light cyan module for discharging only a light cyan (LS) ink and a light magenta module for discharging only a light magenta (LM) ink, in addition to the four nozzle modules, to discharge six or eight colors.

FIG. 7 shows the internal structure of the black nozzle module 50 of the four nozzle modules 50, 52, 54, and 56 as viewed from the side thereof. Ink contained in ink chambers that are provided in nozzles N1, N2, N3, and so on are discharged from the nozzles N1, N2, N3, and so on by piezoelectric elements, such as piezoelectric actuators, which provided in the ink chambers, so that circular dots are printed (discharged) on a white printing medium S. In addition, a voltage to be applied to the piezoelectric elements may be controlled through multi-stages to adjust the amount of ink discharged from the ink chambers, which makes it possible for dots having different sizes to be discharged from the nozzles N1, N2, N3, and so on.

Further, in the printing system (ink module) 200 having the above-mentioned structure, a prescribed amount of ink may be not discharged from the nozzles N1, N2, N3, and so on due to a variation in the size of the nozzle holes or a difference in the supply pressure of ink in the manufacturing process.

In particular, the variation in the discharge amount of ink easily occurs in the nozzle N1 or N2 positioned at the edge of the printing head, as shown in FIG. 7. As a result, ink larger than the prescribed amount may be discharged from the nozzle N1 or N2 positioned at the edge of the printing head, which causes a dot having a larger size than a predetermined size to be printed. For example, as shown in FIG. 4, in a pattern in which the sizes of dots are classified into 8 types including 'no dot', generally, dots (formed on the right side of FIG. 8) formed by the nozzles positioned at the edge of the printing head is one or two sizes larger than dots (formed on the left side of FIG. 8) formed by nozzles other than the nozzles positioned at the edge of the printing head. In addition, it goes without saying that this phenomenon may occur in nozzles other than the nozzle positioned at the edge of the printing head due to a defect in nozzles.

Figure 8:
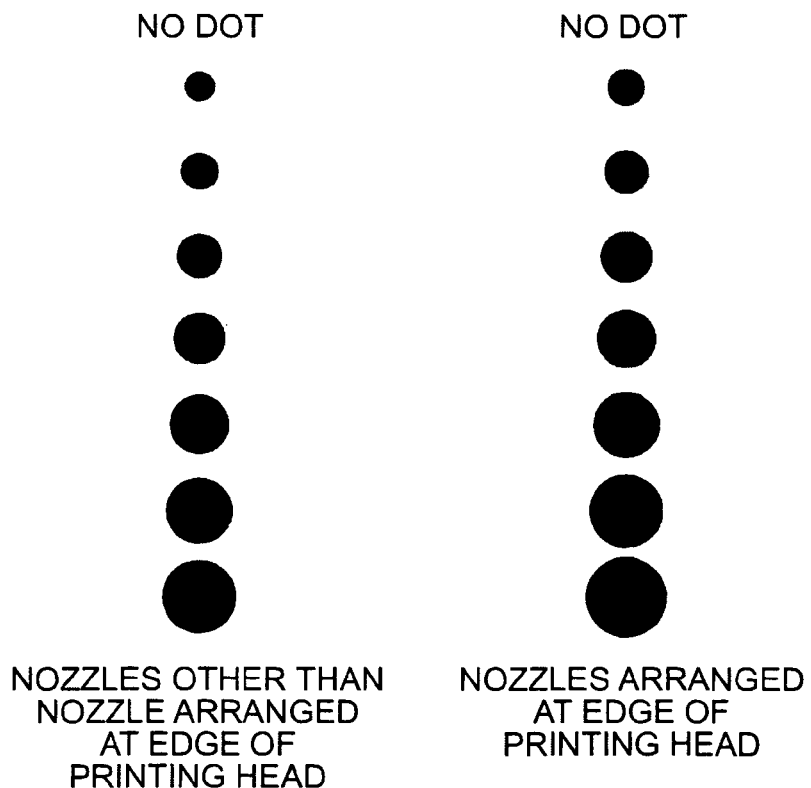
FIG. 8 is a conceptual diagram illustrating a difference in the discharge amount of ink between nozzles arranged at the edge of the printing head and the other nozzles.

FIG. 8 is a conceptual diagram illustrating a difference in the discharge amount of ink between the nozzles positioned at the edge and the other nozzles. As shown in FIG. 8, a dot printed by the nozzle positioned at the edge is one or two sizes larger than a dot printed a nozzle other than the nozzle positioned at the edge.

Figure 9:
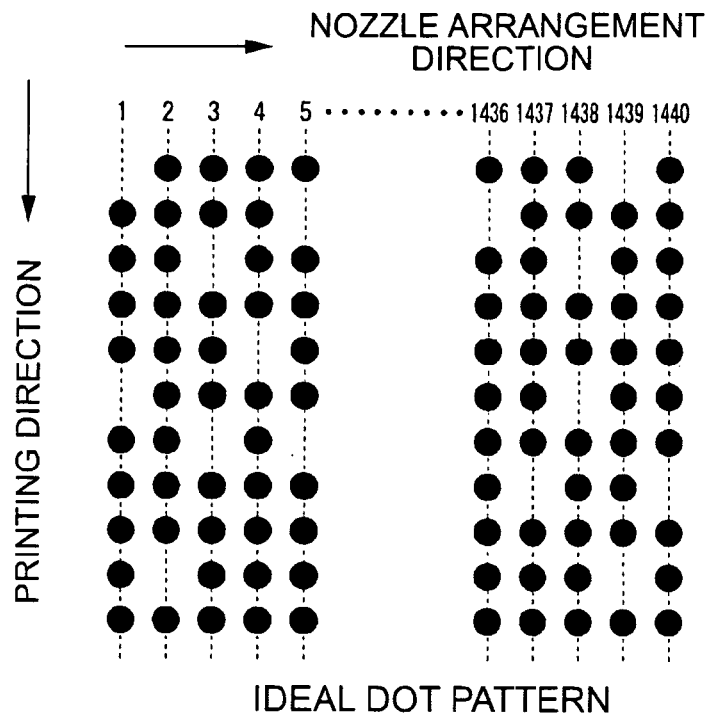
FIG. 9 is a conceptual diagram illustrating an example of a dot pattern when a uniform amount of ink is discharged from all the nozzles.
Figure 10:
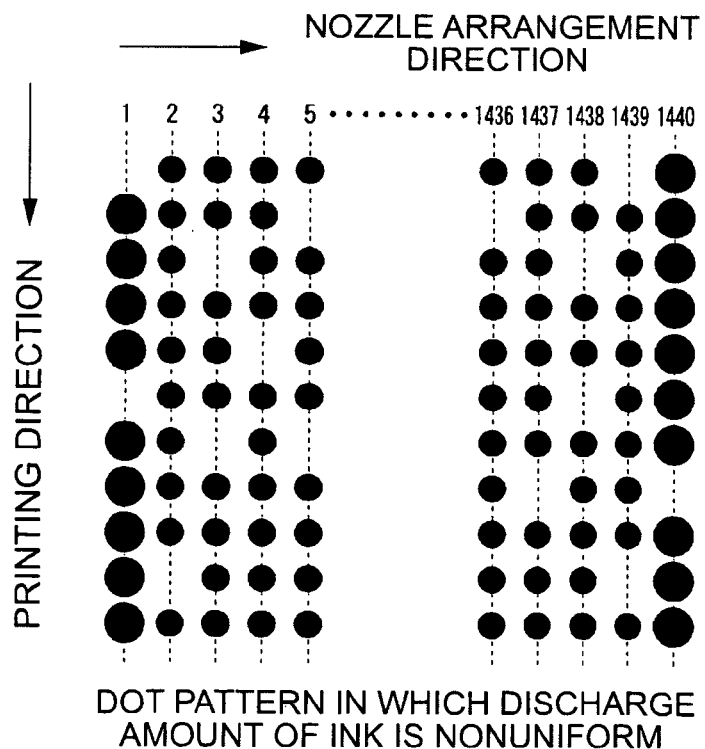
FIG. 10 is a conceptual diagram illustrating an example of a dot pattern when the amount of ink discharged from the nozzles arranged at the edge of the printing head is larger than that discharged from the other nozzles.

Therefore, when printing is performed by using the printing system 200 which discharges a uniform amount of ink from all the nozzles, all dots are printed in a prescribed size (all dots are printed in the same size), as shown in FIG. 9 (an ideal dot pattern). In contrast, as shown in FIG. 7, when printing is performed by using the nozzle module 50 in which the amount of ink discharged from the nozzle positioned at the edge is larger than the amount of ink discharged from the other nozzles, dots printed by the nozzles positioned at the edge of the printing head (in FIG. 10, nozzles N1 and N1440) are one or two sizes larger than dots printed by the other nozzles, as shown in FIG. 10.

The billing information receiving unit 15 has a function of receiving billing information corresponding to a cost or fee with respect to the correction information received by the correction data receiving unit 12 and of notifying the received billing information to the billing unit 16. In addition, the billing information receiving unit 15 may also function as the correction data receiving unit 12 in a hardware manner. In this case, the billing information may be transmitted together with the correction data.

The billing unit 16 performs a predetermined process, on the basis of the billing information received by the billing information receiving unit 15. More specifically, the billing unit 16 has a function of notifying information on the fee to a user or administrator of the printer 110 by using a display device (for example, a CRT or LCD) or a printing function of the printing unit 14. In addition, the billing unit 16 may notify the information on the fee by using, for example, e-mail.

Figure 2:
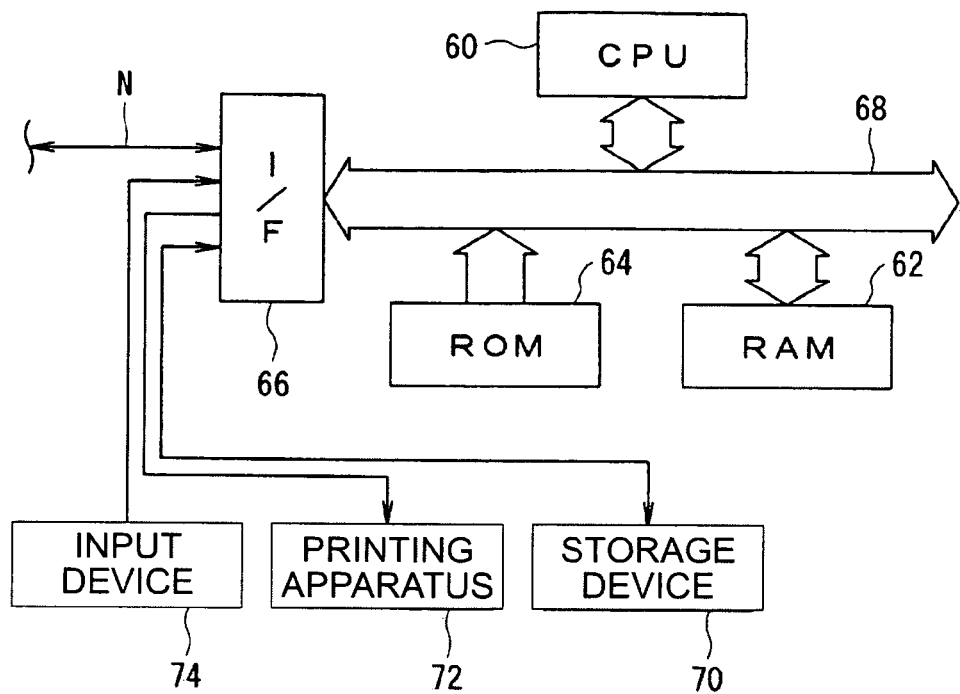
FIG. 2 is a block diagram illustrating the hardware structure of a computer system realizing a printer of the printing system according to the invention.

The printer 110 having the above-mentioned structure includes a computer system for performing various printing control operations and for realizing, for example, the correction data request transmitting unit 10, the printing data acquiring unit 11, the correction data receiving unit 12, the printing data correcting unit 13, the printing unit 14, the billing information receiving unit 15, and the billing unit 16 by using software. According to this hardware structure, as shown in FIG. 2, a CPU 60, which is a central processing unit in charge of various control and arithmetic processes, a RAM (random access memory) 62 forming a main storage, and a ROM (read only memory) 64 are connected to each other by various external buses 68 composed of a PCI (peripheral component interconnect) bus and an ISA (industrial standard architecture) bus. These buses 68 are connected, through an input/output interface (I/F) 66, to an external storage device (a secondary storage) 70, such as an HDD (hard disk drive), a printing device 72, an input device 74 including an operating panel, a mouse, a keyboard, and a scanner, and a network N for communicating with a server apparatus or a printing instruction apparatus (for example, a personal computer; not shown).

When power is turned on, a system program, such as a BIOS, stored in the ROM 64 loads, to the RAM 62, various dedicated computer programs previously stored in the ROM 64, or various dedicated computer programs installed in the storage device 70 through a recording medium, such as a CD-ROM, DVD-ROM, or a flexible disk (FD), or over a communication network N, such as the Internet. Then, the CPU 60 uses various resources to perform predetermined control and arithmetic processes, according to instructions described in the programs loaded into the RAM 62, thereby realizing the functions of the above-mentioned components by using software.

Referring to FIG. 1, the server apparatus 120 includes, as main components, a correction data request receiving unit 20, a correction data acquiring unit 21, a correction data modifying unit 22, a correction data transmitting unit 23, a correction data accuracy calculating unit 24, a charge calculating unit 25, a charge notifying unit 26, a service point calculating unit 27, a correction data storage unit 28, a billing information storage unit 29, and a discount information storage unit 30. The functions of these components will be described below.

First, the correction data request receiving unit 20 receives a correction data receiving request transmitted from the printer 110 over the network N together with information on the printer 110, and notifies the reception to the correction data acquiring unit 22.

Figure 5:
FIG. 5 is an information table illustrating an example of printer information.

FIG. 5 shows an example of information related to the discharge amount of ink from the nozzles of the printing head 200, among the printer information transmitted together with the correction data receiving request.

FIG. 5 shows that the discharge amount of ink discharged from nozzle Nos. '1', '2', and '1440' is one or two level larger than the discharge amount of ink discharged from the other nozzle Nos.

The correction data acquiring unit 21 receives the notice from the correction data request receiving unit 20 to analyze the printer information transmitted together with the correction data receiving request. When a plurality of printers 110 are connected, the correction data acquiring unit 21 has a function of specifying one of the printers 110 transmitting the request and of reading out correction data corresponding to the specified printer 110 from the correction data storage unit 28.

The correction data modifying unit 22 receives the printer information and the correction data acquired by the correction data acquiring unit 21 and modifies the received correction data, on the basis of the printer information, if necessary. Then, the correction data modifying unit 22 transmits the modified correction data to the correction data transmitting unit 23.

Further, when receiving a request to transmit the correction data and a request for the modification rate, the correction data modifying unit 22 modifies the correction data, on the basis of the modification rate. For example, as the modification rate is higher, it takes a longer processing time to obtain the correction data, which results in a lot of time or effort to supply the correction data. In addition, complete data modification may not be needed according to the resolution of the printer 110. Therefore, it is possible to modify the correction data at the modification rate corresponding to the needs of each printer 110.

The correction data transmitting unit 23 receives the correction data modified by the correction data modifying unit 22 as occasion demands and directly transmits the received correction data to the printer 110 over the network N.

The correction data accuracy calculating unit 24 calculates the correction accuracy of the correction data modified by the correction data modifying unit 22.

A method of calculating the correction accuracy of the correction data is not limited to a specific method, and the correction accuracy of the correction data can be calculated by the following expression 1:

$$\text{correction accuracy } C=G(Y) \quad (1),$$

where Y is the average value of the correction data, and G is a viscosity calculating function.

According to the expression, for example, when the average value of the correction data is in the range of 0 to 10, the correction accuracy is 100%. When the average value of the correction data is in the range of 10 to 30, the correction accuracy is 80%. When the average value of the correction data is in the range of 30 to 80, the correction accuracy is 50%. When the average value of the correction data is larger than 80, the correction accuracy is 30%.

The charge calculating unit 25 calculates a charge corresponding to a process of sending the correction data transmitted from the correction data transmitting unit 23.

Further, the charge calculating unit 25 calculates the charge corresponding to the correction data transmitting process, on the basis of various information items, such as the modification rate of the correction data from the correction data receiving unit 22, the correction accuracy of the correction data calculated by the correction data accuracy calculating unit 24, and a service point calculated by the service point calculating unit 27, which will be described later.

The charge notifying unit 26 directly notifies the charge calculated by the charge calculating unit 25 and necessary information, such as a discount charge, to the printer 110 over the network N. In addition, the charge notifying unit 26 may also function as the correction data request receiving unit 20 or the correction data transmitting unit 23 in a hardware manner. In this case, the charge may be transmitted together with the correction data by the correction data transmitting unit 23.

The service point calculating unit 27 calculates a service point, on the basis of a request to transmit the correction data sent from the printer 110 or reception information. That is, the service point calculating unit 27 calculates a service point for each printer 110, on the basis of how many times the correction data is used in each printer 110, how frequently the correction data is used, and the modification rate of the correction data, and stores these information items. In addition, the service point calculating unit 27 supplies information on the service point for each printer 110 at the request of the charge calculating unit 25.

The correction data storage unit 28 is a database (DB) having a large amount of correction data for each printer 110 stored therein, and supplied the correction data at the request of the correction data acquiring unit 21. In addition, the correction data storage unit 28 stores the printer information received from the correction data request transmitting unit 10 and updates the content of the printer information, if necessary. Further, the correction data storage unit 28 acquires and stores the latest correction data over the network N for a proper period, such as an idle time of the system, and updates the correction data.

The billing information storage unit 29 is a database (DB) having a large amount of billing information, such as a cost or charge related to the supply of various correction data stored in the correction data storage unit 28, and supplies billing information required for the charge calculating unit 25 to calculate the charge at the request of the charge calculating unit 25. In addition, similar to the correction data storage unit 28, the billing information storage unit 29 acquires and stores the latest correction data over the network N for a proper period, such as at an idle time of the system, and updates the correction data.

The discount information storage unit 30 is a database (DB) having information for discounting a portion of or all the charge according to the service point calculated by the service point calculating unit 27 or information related to a discount rate with respect to the price of consumables when the consumables are needed as described below stored therein, and supplies discount information required for the charge calculating unit 25 to calculate the charge at the request of the charge calculating unit 25.

Figure 3:
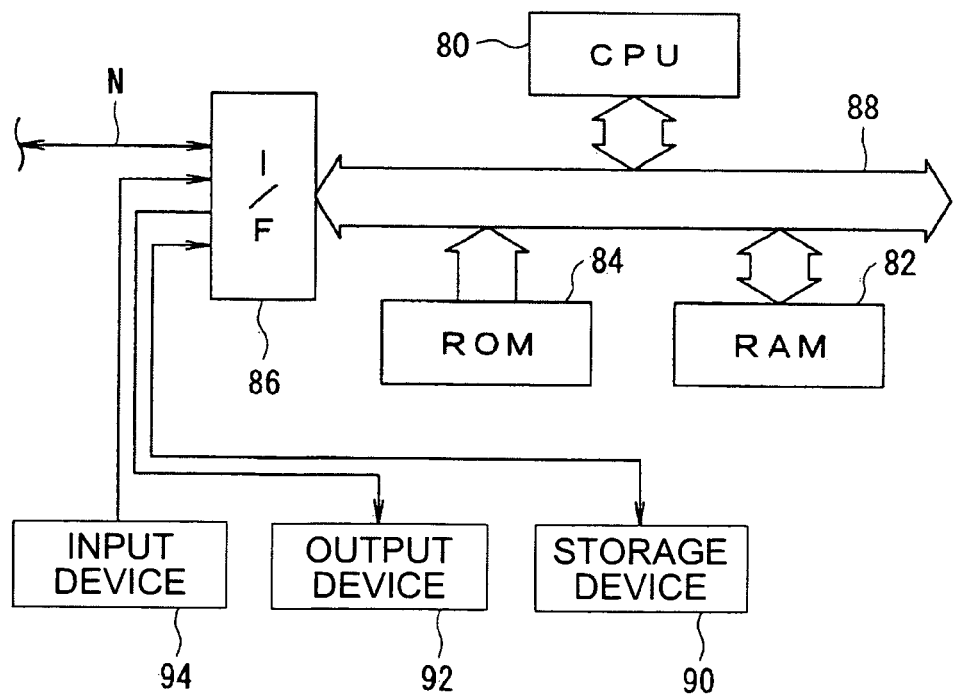
FIG. 3 is a block diagram illustrating the hardware structure of a computer system realizing a server apparatus of the printing system according to the invention.

Similar to the printer 110, the server apparatus 120 includes a computer system for realizing the correction data request receiving unit 20, the correction data acquiring unit 21, the correction data modifying unit 22, the correction data transmitting unit 23, the correction data accuracy calculating unit 24, the charge calculating unit 25, the charge notifying unit 26, the service point calculating unit 27, the correction data storage unit 28, the billing information storage unit 29, and the discount information storage unit 30 by using software. According to this hardware structure, as shown in FIG. 3, a CPU 80, which is a central processing unit in charge of various control and arithmetic processes, a RAM 82, and a ROM 84 are connected to one another by various internal buses 88 composed of a PCI bus and an ISA bus. These buses 88 are connected, through an input/output interface (I/F) 86, to an external storage device 90, such as an HDD, an output device 92, such as a CRT or LCD monitor, an input device 94 including an operating panel, a mouse, a keyboard, and a scanner, and a network N for communicating with a printing instruction apparatus (not shown).

When power is turned on, a system program, such as a BIOS, stored in the ROM 94 loads, to the RAM 92, various dedicated computer programs previously stored in the ROM 94, or various dedicated computer programs installed in the storage device 90 through a recording medium, such as a CD-ROM, DVD-ROM, or a flexible disk (FD), or over a communication network N, such as the Internet. Then, the CPU 90 uses various resources to perform predetermined control and arithmetic processes, according to instructions described in the programs loaded into the RAM 92, thereby realizing the functions of the above-mentioned components by using software.

Further, when the Internet is used as the network N, for example, TCP/IP, which is a standard protocol used for the Internet, is used as a protocol (communication protocol) used for transmitting information between the printer 110 and the server apparatus 120. However, the protocol is not limited thereto.

Figure 11:
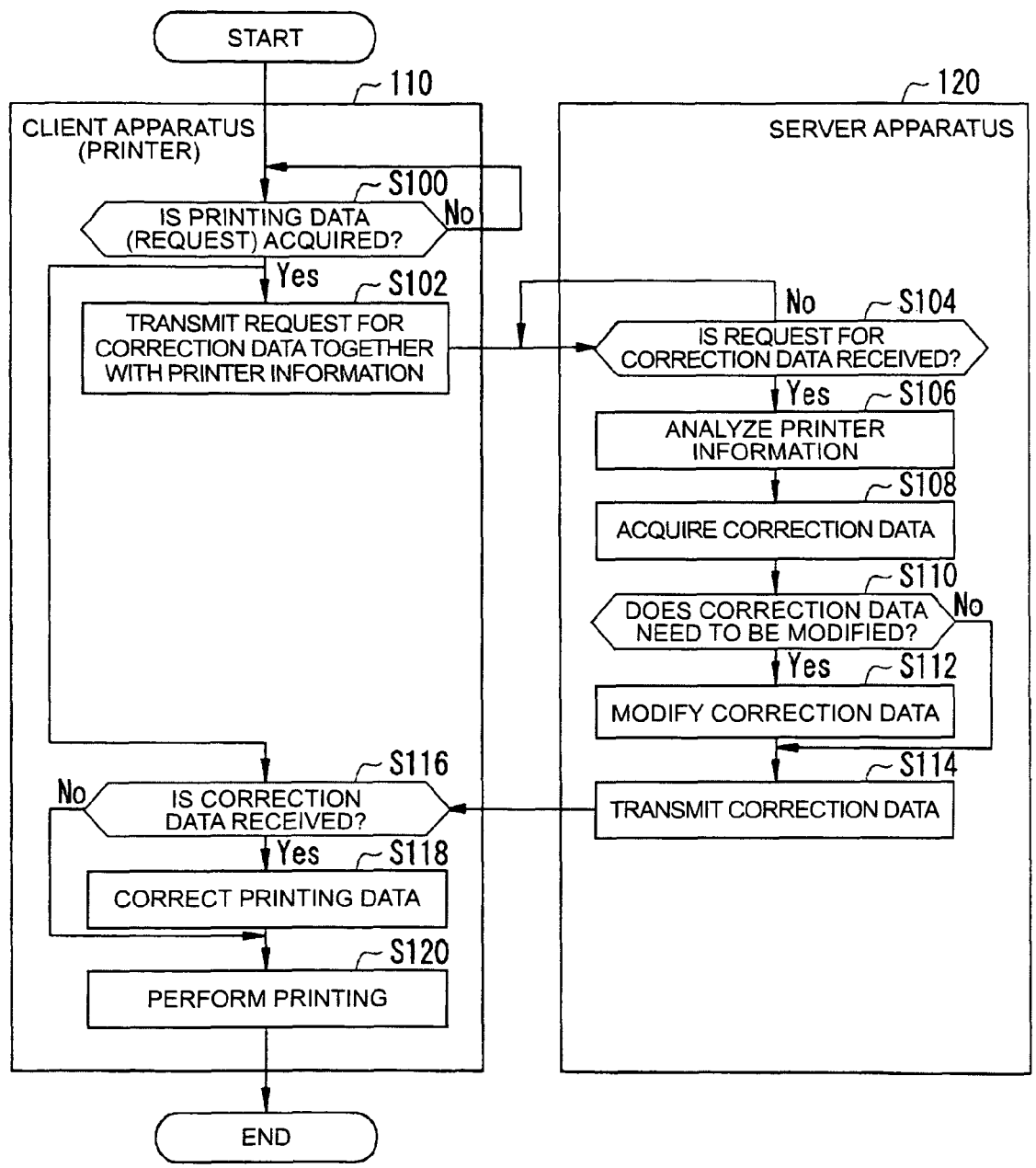
FIG. 11 is a flow chart illustrating the flow of a process according to a first embodiment of the invention.
Figure 12:
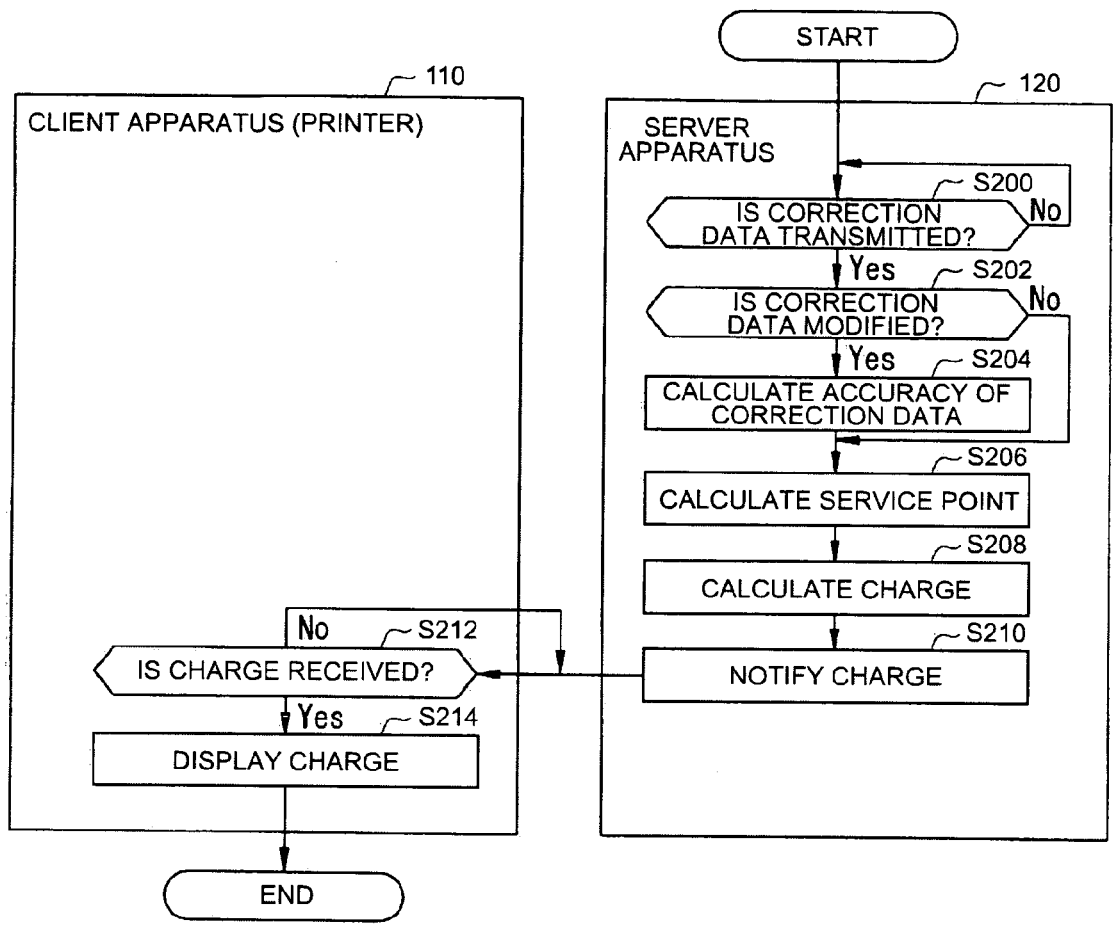
FIG. 12 is a flow chart illustrating the flow of a process of imposing a charge for the supply of correction data.

Next, an example of a printing process performed by the printing system 100 having the above-mentioned structure will be described, mainly referring to FIGS. 1 and 12. FIG. 11 is a flow chart illustrating the overall flow of a printing process from a step of requesting to acquire correction data to a step of performing printing by using the correction data. FIG. 12 is a flow chart illustrating the overall flow of a process from a step of calculating a charge generated when the correction data is acquired to a step of notifying the charge.

As shown in the flow chart of FIG. 11, when a predetermined initial operation for a printing process or a confirmation operation for communication is completed after power is turned on, the printing system 100 performs an initial step S100. In step S100, when a printing instruction terminal (not shown), such as a personal computer, is connected, the printing data acquiring unit 12 of the printer 110 monitors whether the printing instruction terminal transmits printing data and an explicit printing instruction. When it is determined that the printing instruction terminal transmits the printing instruction (Yes), the process proceeds to the next step S102, and the correction data request transmitting unit 10 transmits a correction data request and printer information to the server apparatus 120 over the network N. Then, the process proceeds to the next step S104.

In step S104, when a plurality of printers 110 are connected to the network N, the correction data request receiving unit 20 monitors which of the printers 110 transmits the correction data request. When it is determined that the correction data is received (Yes), the process proceeds to the next step S106 to analyze the printer information transmitted together with the correction data in order to specify one of the printer 110 to perform the request.

When the printer 110 to perform the correction data request is specified in this way, the process proceeds to the next step S108, and the correction data acquiring unit 22 acquires correction data corresponding to the specified printer 110 from the correction data storage unit 28. Then, the process proceeds to the next step S110.

In step S110, the correction data modifying unit 24 determines whether to modify the acquired correction data, on the basis of the printer information. When it is determined that the acquired correction data does not need to be modified (No), the process is jumped to step S114. On the other hand, when the acquired correction data needs to be modified (Yes), the process proceeds to the next step S112.

In step S112, the correction data modifying unit 24 modifies the acquired correction data according to the content of modification, and transmits the modified correction data to the correction data transmitting unit 26.

For example, when a remarkable variation occurs in the discharge amount of ink if 'the residual quantity of ink' which is included in the printer information transmitted together with the correction data receiving request is smaller than a certain value, the value is set to a threshold value. When the residual quantity of ink is larger than the threshold value, the acquired correction data is not modified, but is transmitted to the correction data transmitting unit 26 as it is (in the original state). When 'the residual quantity of ink' is larger than the threshold value, the printer 110 cannot completely correct the printing data. Therefore, the correction data modifying unit optimally modifies the acquire correction data according to 'the residual quantity of ink'.

That is, as shown in FIG. 10, when the printing head 200 of the printer 110 performed the correction data acquiring request has a printing characteristic in which only the nozzles arranged at the edge of the printing head discharge a larger amount of ink, the acquired correction data has a content to correct the printing data such that the dot sizes of pixels corresponding to the nozzles arranged at the edge of the printing head are one or more levels smaller than those of pixels corresponding to the other nozzles. However, when the residual quantity of ink is smaller than a predetermined value, a variation in the discharge amount of ink occurs not only in the nozzles arranged at the edge of the printing head but also in other nozzles adjacent thereto.

Further, in this case, it is possible to completely control the amount of ink discharged from the nozzles arranged at the edge of the printing head by using only the acquired original correction data. However, the amount of ink discharged from the other nozzles cannot be controlled by using only the acquired original correction data.

Accordingly, in step S112 (the correction data modifying unit 24), the correction data is modified, considering the current conditions of the printer 110, such as the 'residual amount of ink', which makes it possible to generate and provide correction data most suitable for the current conditions of the printer 110.

Therefore, the following method may be used to modify correction data on the basis of 'the residual quantity of ink'. A correction f(x) corresponding to a residual quantity X of ink is calculated, and correction data is modified on the basis of the correction f(x), as shown in the following modified expression 2:

$$\text{correction data } y' = y + \alpha * f(x) \qquad (2).$$

In step S112, the correction data may be modified on the basis of information related to the number of printings, and the average temperature and the average humidity of the internal and external sides of a case of the printer 110 (all these factors have a great influence on the discharge amount of ink), in addition to information related to 'the residual quantity of ink'. In addition, it is possible to easily obtain the modified expression by previously making an experiment on a change in printing results under various conditions.

When the modification of the correction data is completed in this way, the process proceeds to step S114, and the correction data transmitting unit 26 transmits the correction data acquired from the correction data storage unit 28 or the correction data modified by the correction data modifying unit 24 to the printer 110 over the network N. Then, the process proceeds to the next step S116.

In step S116, the printing data receiving unit 14 of the printer 110 requests the server apparatus to transmit correction data and determines whether the correction data is received in a predetermined time. When it is determined that the correction data is not received in the predetermined time (No), the process is jumped to the final step S120. On the other hand, when it is determined that the correction data is received in the predetermined time (Yes), the printing data receiving unit 14 transmits the acquired correction data to the printing data correcting unit 16, and the process proceeds to the next step S118. Then, the printing data acquired by the printing data acquiring unit 12 is corrected on the basis of the correction data.

When the correction of the printing data is completed in this way, the process proceeds to the final step S120, and the printing unit 18 performs printing by using the printing head 200.

In this way, each of the printers 110 can timely acquire from the server apparatus 120 the correction data most suitable for the deterioration thereof with time as well as the correction data based on the information of the apparatus.

As a result, it is possible to reliably obtain a high-quality printed matter with uniform density, and it is unnecessary to store a large amount of correction data in each printer 110. Thus, a memory (a storage device) for storing the correction data is not needed.

Further, since each of the printers 110 does not need to independently modify the correction data, it is possible to suitably use the information processing capacity of each printer 110.

As shown in the flow chart of FIG. 12, in the server apparatus 120 of the printing system 100, in step S200 subsequent to the above-mentioned step, it is determined whether the correction data transmitting unit 23 transmits predetermined correction data at the request of the printer 110. When it is determined that the correction data 23 transmits the correction data (Yes), the process proceeds to the next step S202 to determine whether the transmitted correction data is modified by the correction data modifying unit 22.

As a result, when it is determined that the correction data is not modified (No), the process skips the next step S204 and proceeds to step S206. On the other hand, when it is determined that the correction data is modified by the correction data modifying unit 22 (Yes), the correction data accuracy calculating unit 24 calculates the correction accuracy of the correction data in step S204, and the process proceeds to the next step S206. Then, the service point calculating unit 27 calculates a service point.

When the correction data accuracy calculating unit 24 and the service point calculating unit calculate the correction accuracy of the correction data and the service point, respectively, the process proceeds to the next step S208, and the charge calculating unit 25 calculates a charge for the supply of the correction data. Then, in the next step S210, the charge notifying unit 26 notifies the calculated charge to the printer 110 at the same time when the correction data is transmitted or within a predetermined period after the correction data is transmitted.

A method of calculating the charge in the charge calculating unit 25 in step S208 is not limited to a specific method. For example, according to the expression 1 for calculating the correction accuracy, when the average value of the correction data is 20, the correction accuracy is 80%, so that the charge is reduced to 80%, or the service point increases by 20%. That is, the final charge is determined by reducing or raising a basic charge by a predetermined percentage.

Further, in the charge calculating step, when the printer 110 performs a request to acquire correction data and a request related to the correction accuracy of the correction data and the correction data modifying unit 22 modifies the correction data according to the requested correction accuracy to generate and supply correction data, the charge may be calculated to correspond to the accuracy of the request.

For example, in a case in which the correction accuracy, the correcting function, the charge, and the discount rate are associated with one another as follows: correction accuracy: lower than 50%, a correcting function: F1( ), a charge: 100%, and a discount rate: 100%; correction accuracy: 50% to 75%, a correcting function: F2( ), a charge: 120%, and a discount rate: 150%; and correction accuracy: higher than 50%, a correcting function: F3( ), a charge: 150%, and a discount rate: 200%, for example, when an administrator or user of the printer 110 calculates the maximum (MAX) of correction accuracy, a charge that is one and a half times larger than a basic charge is paid. In addition, in this case, the discount rate is 200%, and a point two times larger than a basic point is obtained. In this example, the correcting functions F1 to F3 indicate methods of generating the correction data, respectively. For example, the processing time of the correcting function F3 is three times longer than that of the correcting function F1.

Meanwhile, in the printer 110 having received the notice, in step S212, it is determined whether the billing information receiving unit 15 receives information related to, for example, a charge. When it is determined that the billing information receiving unit 15 receives the information (Yes), the process proceeds to the next step S214, and the billing unit 16 displays the charge on a display device, such as a liquid crystal monitor. Then, the process is ended.

In this way, an administrator or user of the printer 110 performed a request to acquire correction data can know a service charge or fee for the supply of the correction data and accounting information, such as a discount rate and an extra charge, which makes it possible to establish a clear billing system.

As a result, it is possible to smoothly perform a billing process on a service for providing correction data to the printer 110 (the client apparatuses).

Further, in this embodiment, the server apparatus 120 modifies the correction data, but the printer 110 may modify the correction data. When the server apparatus 120 supplies the correction data, but does not need to modify the correction data, the discount rate may be raised, or a rate of providing a service point may be improved.

Furthermore, in this embodiment, the correction data is acquired from the server apparatus 120 whenever printing is requested. In this case, when traffic delays occur in the network N, it takes a long time to acquire the correction data.

Therefore, the correction data may be acquired at timings other than the above-mentioned timing. For example, the correction data may be acquired at the time of first printing in a day (or a week, a month, or several months), at printing intervals of X days, whenever Y sheets are printed, whenever the residual quantity of ink (toner) is Z percent, and a printer drive is updated.

Further, databases, such as the correction data storage unit 28, the billing information storage unit 29, and the discount information storage unit 30, are provided in the server apparatus 120. However, the databases may be provided in another server apparatus (not shown) connected to the network N.

That is, when the databases are provided in the server apparatus 120, it is possible to rapidly acquire necessary correction data. On the other hand, when the databases are provided in another server apparatus, it is possible to store a large amount of data and to considerably reduce a storage capacity required for the server apparatus 120.

Further, in this embodiment, the 'printer 110' and the 'server apparatus 120' respectively correspond to a 'client apparatus' and a 'server apparatus' of a printing system according to a first aspect described in the summary of the invention. In addition, the correction data request transmitting unit 10, the printing data acquiring unit 11, the correction data receiving unit 12, the billing information receiving unit 15, and the billing unit 16 of the 'printer 110' respectively correspond to a correction data request transmitting unit, a printing data acquiring unit, a correction data receiving unit, a billing information receiving unit, and a billing unit of the 'client apparatus' of the printing system according to the first aspect described in the summary of the invention.

Furthermore, the correction data request receiving unit 20, the correction data acquiring unit 21, the correction data modifying unit 22, the correction data transmitting unit 23, the correction data accuracy calculating unit 24, and the charge calculating unit 25, and the charge notifying unit 26 of the 'server apparatus 120' respectively correspond to a correction data request receiving unit, a correction data acquiring unit, a correction data modifying unit, a correction data transmitting unit, a correction data accuracy calculating unit, and a charge calculating unit, and a charge notifying unit of the 'server apparatus' of the printing system according to the first or second aspect described in the summary of the invention.

Moreover, when the printing head 200 and the printing unit 14 are separated from the printer 110 of the printing system 100 according to the invention, it is possible to realize the functions thereof by using only a general-purpose information processing apparatus (an image processing apparatus), such as a personal computer. In this case, it is possible to realize the functions of the above-mentioned components by allowing a general-purpose computer system, such as a personal computer (PC), to execute software. In addition, for example, the printing head, the printing unit, and a cut-out portion may be provided in the printing apparatus.

That is, when the functions of the correction data request transmitting unit 10, the correction data receiving unit 12, the printing data correcting unit 13, the billing information receiving unit 15, and the billing unit 16 of the printer 110 are realized by a general-purpose information processing apparatus, such as a personal computer, it is possible to use the existing inkjet-type printing apparatus (a printer) without separately manufacturing a dedicated printer 110.

Figure 13:
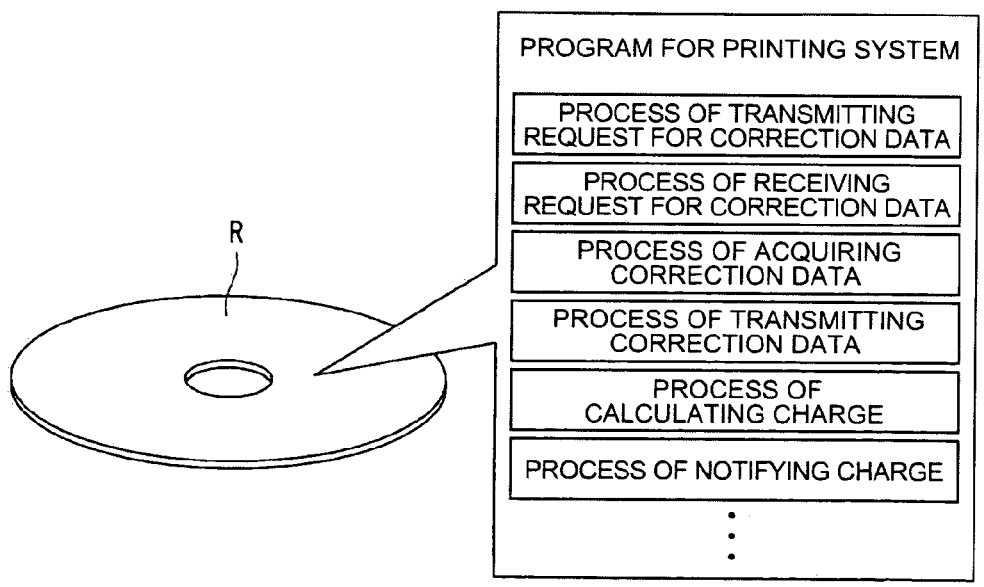
FIG. 13 is a conceptual diagram illustrating an example of a computer readable recording medium having a program stored therein according to the invention.

Further, it is possible to realize the functions of the components forming the printing system 100 of the invention by allowing a computer system incorporated into the existing printer to execute software, such as a computer program. In addition, the computer program can be previously stored in a semiconductor ROM, and the semiconductor ROM can be incorporated into a user's computer. Alternatively, the computer program can be installed to the user's computer over a network, such as the Internet, or it can be installed to the user's computer through computer readable recording media, such as a CD-ROM, a DVD-ROM, and an FD, as shown in FIG. 13. In this way, the computer program can be easily provided to users.

Figure 14:
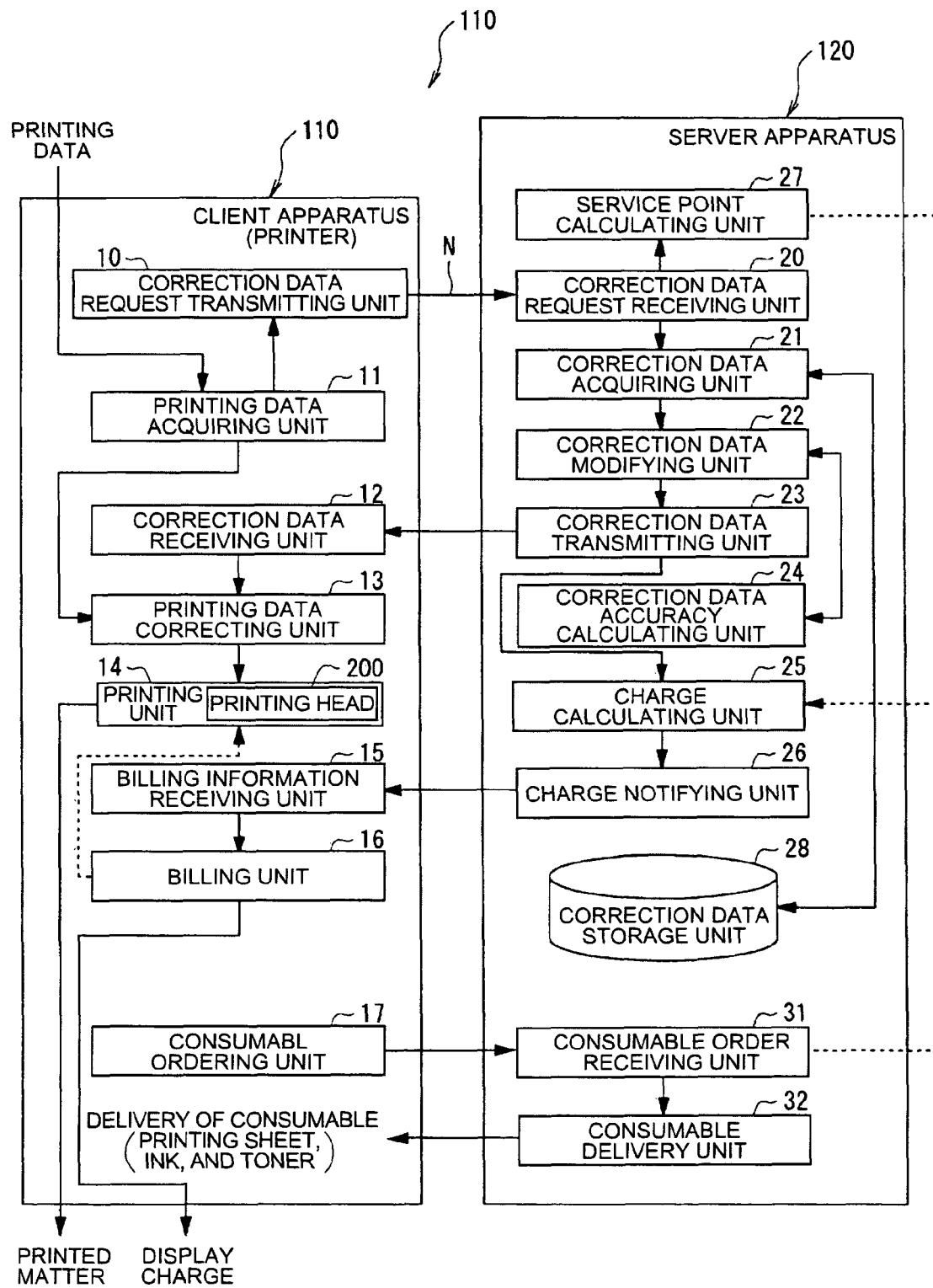
FIG. 14 is a functional block diagram illustrating a printing system according to a second embodiment of the invention.
Figure 15:
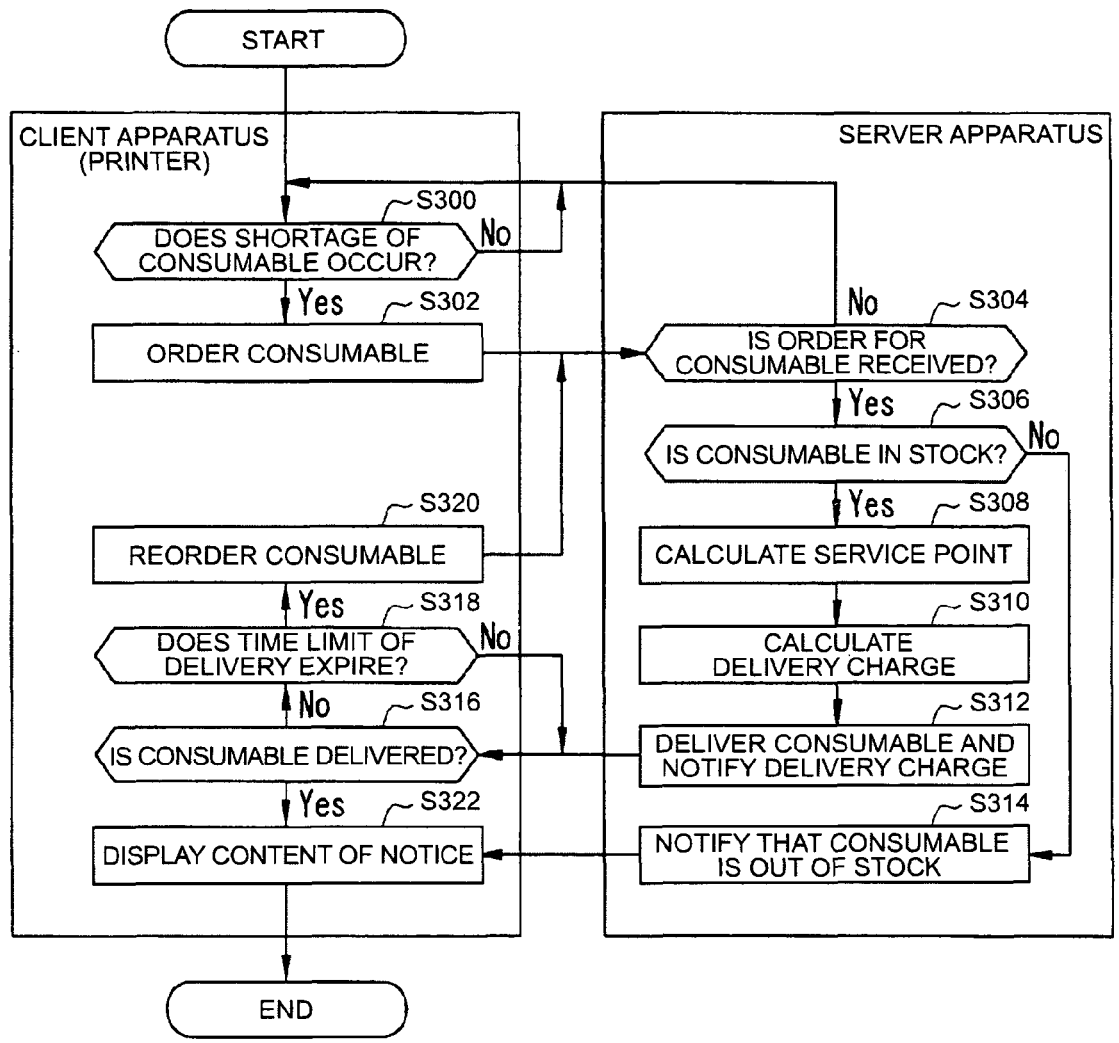
FIG. 15 is a flow chart illustrating the flow of a process of delivering a consumable according to the second embodiment.

FIGS. 14 and 15 are block diagrams illustrating a printing system 100, a printing system program, a printing method, a server apparatus, a server apparatus program, a printer, a printer program, and a computer readable recording medium having the programs stored therein according to a second embodiment of the invention.

FIG. 14 is a functional block diagram illustrating the printing system 100 according to the second embodiment of the invention.

As shown in FIG. 14, similar to the first embodiment, in the printing system 100, one or more printers (client apparatuses) 110 and server apparatuses 120 are connected to each other over a wire/wireless network N including a wide area network (WAN), such as the Internet, and a local area network (LAN), such as the Ethernet (registered trademark) such that they can communicate with each other.

Further, the printer 110 includes a correction data request transmitting unit 10, a printing data acquiring unit 11, a correction data receiving unit 12, a printing data correcting unit 13, a printing unit 14, a billing information receiving unit 15, a billing unit 16, and a consumable ordering unit 17. Hereinafter, the functions of the components other than the consumable ordering unit 17 are the same as those in the first embodiment.

That is, the consumable ordering unit 17 has a function of placing an order for various consumables used for the printing unit 14 to performing printing, such as printing sheets, ink, and toner with the server apparatus 120 over the network N.

Meanwhile, the server apparatus 120 includes a correction data request receiving unit 20, a correction data acquiring unit 21, a correction data modifying unit 22, a correction data transmitting unit 23, a correction data accuracy calculating unit 24, a charge calculating unit 25, a charge notifying unit 26, a service point calculating unit 27, a correction data storage unit 28, a billing information storage unit 29 (not shown), discount information storage unit 30 (not shown), a consumable order receiving unit 31, and a consumable delivery unit 32. The functions of the components other than the consumable order receiving unit 31 and the consumable delivery unit 32 are the same as those in the first embodiment.

That is, the consumable order receiving unit 31 has a function of receiving the order placed by the consumable ordering unit 17 of the printer 110. The consumable delivery unit 32 has a function of delivering consumables corresponding to the order received by the consumable order receiving unit 31. More specifically, the consumable delivery unit 32 manages the stock of consumables and disposes deliverers.

Further, the charge calculating unit 25 of this embodiment calculates a delivery charge corresponding to the delivery of a predetermined consumable to the printer 110 and notifies the delivery charge to the printer 110.

FIG. 15 is a flow chart illustrating a process related to the delivery of the consumable.

As shown in FIG. 15, in a first step S300, the consumable ordering unit 17 of each printer 110 monitors the amount of a consumable of the printing unit 14. When the residual amount of the consumable is smaller than a predetermined value, the consumable ordering unit 17 determines that the consumable is short (Yes). Then, the process proceeds to the next step S302, and the consumable ordering unit 17 places an order for the corresponding consumable with the server apparatus 120.

The consumable order receiving unit 31 of the server apparatus 120 always monitors whether the printer 110 places an order for consumables. When it is determined in step S304 that the order of the consumable is made (received) (Yes), information or the order, such as the information of the printer 110 of the orderer, the type of the ordered consumable, and the delivery data of the consumable, is analyzed, and the process proceeds to the next step S306 to determine whether to check the stock of the consumables, that is, whether the required consumable can be delivered by the delivery date.

When it is determined in step S308 that the consumable ordered is in stock (Yes), the process proceeds to the next step S309, and the charge calculating unit 25 calculates a service point when the correction data is provided, on the basis of the previous transactions with the printer 110, and calculates a delivery charge of the consumable in consideration of the service point. For example, the service point calculating unit 27 gives each printer 110 service points according to the amount of consumables ordered and how frequently the order is made, and discounts the delivery charge of the consumables for the printer 110 frequently placing an order for consumables, corresponding to the service point.

When the delivery charge is calculated in step S310, the process proceeds to the next step S312. Then, the consumable delivery unit 32 asks a deliverer contracted therewith to deliver the consumable, and notifies the calculated delivery charge of the consumable to the printer 110.

Meanwhile, when it is determined in step S306 that the consumable ordered is out of stock, the process proceeds to step S314, and the consumable delivery unit 32 notifies the printer 110 of the fact that the consumable ordered is out of stock.

Next, in step S320, the printer 110 having received the delivery of the consumable and the delivery charge in step S312 always monitors whether the consumable ordered is delivered. When it is determined that the consumable is not delivered (No), the process proceeds to step S218 to determine whether the delivery date passes. As a result, when it is determined that the delivery data does not pass, the process returns to step S316. On the other hand, when it is determined that the delivery data passed (Yes), the process proceeds to step S320 to reorder the consumable.

Meanwhile, when it is determined in step S316 that the consumable ordered is delivered within the delivery data, the process proceeds to the next step S322 to display the content of the notice on a display device, such as a liquid crystal monitor. Then, the process is ended. In addition, even when a notice indicating no stock is received, the notice is displayed on the display device in step S322, and then the process is ended.

In this embodiment, each printer 110 is provided with the consumable ordering unit 17, and the server apparatus 120 is provided with the consumable order receiving unit 31 and the consumable delivery unit 32. Therefore, it is possible to automatically perform complicated processes, such as a process of ordering consumables and a process of delivering the consumables, and thus to improve the convenience of a printing system.

Further, an additional service of discounting a portion of or all the delivery charge as well as a point restoring service can be provided to the printer (the client apparatus) 110 that orders consumables in large quantities or frequently. As a result, the utilization of consumables recommended by the server apparatus 120 is raised, and high-quality printed matters can be maintained, which makes it possible to make the maintaining costs of the printing system 100 according to the invention and to increase the income of a system operator.

Further, in this embodiment, the 'printer 110' and the 'server apparatus 120' respectively correspond to a 'client apparatus' and a 'server apparatus' of a printing system according to the first aspect described in the summary of the invention. In addition, the printing data acquiring unit 11, the correction data receiving unit 12, the printing data correcting unit 13, the printing unit 14, and the consumable ordering unit 17 of the 'printer 110' respectively correspond to a printing data acquiring unit, a correction data receiving unit, a printing data correcting unit, a printing unit, and a consumable ordering unit of the 'client apparatus' of the printing system according to a fourth or fifth aspect described in the summary of the invention.

Furthermore, the consumable order receiving unit 31, the consumable delivery unit 32, the charge calculating unit 25, and the service point calculating unit 27 of the 'server apparatus 120' respectively correspond to a consumable order receiving unit, a consumable delivery unit, a charge calculating unit, and a service point calculating unit of a 'server apparatus' of a printing system according to any one fourth to sixth aspects described in the summary of the invention.

Moreover, similar to the first embodiment, when the printing head 200 and the printing unit 14 are separated from the printer 110 of the printing system 100 according to the invention, it is possible to realize the functions thereof by using only a general-purpose information processing apparatus (an image processing apparatus), such as a personal computer. In this case, it is possible to realize the functions of the above-mentioned components by allowing a general-purpose computer system, such as a personal computer (PC), to execute software. In addition, for example, the printing head, the printing unit, and a cut-out portion may be provided in the printing apparatus.

That is, when the functions of the correction data request transmitting unit 10, the correction data receiving unit 12, and the printing data correcting unit 13 of the printer 110 are realized by a general-purpose information processing apparatus, such as a personal computer, it is possible to use the existing inkjet-type printing apparatus (a printer) without separately manufacturing a dedicated printer 110.

Further, it is possible to realize the functions of the components forming the printing system 100 of the invention by allowing a computer system incorporated into the existing printer to execute software, such as a computer program. In addition, the computer program can be previously stored in a semiconductor ROM, and the semiconductor ROM can be incorporated into a user's computer. Alternatively, the computer program can be installed to the user's computer over a network, such as the Internet, or it can be installed to the user's computer through computer readable recording media R, such as a CD-ROM, a DVD-ROM, and an FD, as shown in FIG. 13. In this way, the computer program can be easily provided to users.

What is claimed is:

1. A printing system comprising:
a client apparatus which deals with printing data; and
a server apparatus which is connected to the client apparatus so as to communicate therewith,
wherein the client apparatus includes:
a correction data request transmitting unit which requests the server apparatus to transmit correction data used for correcting the printing data;
a correction data receiving unit which receives predetermined correction data transmitted from the server apparatus at the request of the correction data request transmitting unit;
a billing information receiving unit which receives billing information on the correction data received by the correction data receiving unit; and
a billing unit which performs a predetermined process on the basis of the billing information received by the billing information receiving unit, and
the server apparatus includes:
a correction data request receiving unit which receives the request to transmit the correction data from the client apparatus;
a correction data acquiring unit which acquires, from a correction data storage unit, predetermined correction data corresponding to the request to transmit the correction data received by the correction data request receiving unit;
a correction data transmitting unit which transmits, to the client apparatus, the correction data acquired by the correction data acquiring unit;
a correction data modifying unit which modifies the correction data acquired by the correction data acquiring unit and transmits the modified correction data to the correction data transmitting unit;
a correction data accuracy calculating unit which calculates a correction accuracy of the correction data modified by the correction data modifying unit;
a service point calculating unit that calculates a service point associated with the client apparatus based on the request to transmit the correction data received from the client apparatus, a frequency that the correction data acquired by the correction data acquiring unit is used in the client apparatus, and a modification rate of the correction data;
a charge calculating unit which calculates a charge corresponding to a process of sending the correction data transmitted from the correction data transmitting unit, the charge calculating unit calculating the charge based on the service point calculated by the service point calculating unit and the correction accuracy of the correction data calculated by the correction data accuracy calculating unit; and
a charge notifying unit which notifies the client apparatus of the charge calculated by the charge calculating unit.

2. The printing system according to claim 1,
wherein the client apparatus further includes:
a printing data acquiring unit which acquires printing data used for printing;
a printing data correcting unit which corrects the printing data acquired by the printing data acquiring unit, on the basis of the correction data received by the correction data receiving unit;
a printing unit which performs printing, on the basis of the printing data corrected by the printing data correcting unit; and
a consumable ordering unit which places an order for a consumable used for the printing unit with the server apparatus,
the server apparatus further includes:
a consumable order receiving unit which receives an order from the consumable ordering unit; and
a consumable delivery unit which deliveries a predetermined consumable to the client apparatus, on the basis of information on the order received by the consumable order receiving unit, and
the charge calculating unit calculates a delivery charge corresponding to the delivery of the predetermined consumable to the client apparatus and notifies the delivery charge to the client apparatus.

3. The printing system according to claim 2,
wherein the server apparatus further includes a service point calculating unit which calculates a service point on the basis of the request to transmit the correction data or information received from the client apparatus, and
the charge calculating unit of the server apparatus calculates the delivery charge, on the basis of the service point calculated by the service point calculating unit.

4. A printing program stored in a non-transitory computer readable medium, the printing program being used for a printing system including a client apparatus which deals with printing data and a server apparatus which is connected to the client apparatus so as to communicate therewith,
wherein the printing program allows a computer of the client apparatus to function as:
a correction data request transmitting unit which requests the server apparatus to transmit correction data used for correcting the printing data;

a correction data receiving unit which receives predetermined correction data transmitted from the server apparatus at the request of the correction data request transmitting unit;

a billing information receiving unit which receives billing information on the correction data received by the correction data receiving unit; and a billing unit which performs a predetermined process on the basis of the billing information received by the billing information receiving unit, and the printing program allows a computer of the server apparatus to function as:

a correction data request receiving unit which receives a request to transmit the correction data from the client apparatus;

a correction data acquiring unit which acquires, from a correction data storage unit, predetermined correction data corresponding to the request to transmit the correction data received by the correction data request receiving unit;

a correction data transmitting unit which transmits, to the client apparatus, the correction data acquired by the correction data acquiring unit;

a correction data modifying unit which modifies the correction data acquired by the correction data acquiring unit and transmits the modified correction data to the correction data transmitting unit;

a correction data accuracy calculating unit which calculates a correction accuracy of the correction data modified by the correction data modifying unit;

a service point calculating unit that calculates a service point associated with the client apparatus based on the request to transmit the correction data received from the client apparatus, a frequency that the correction data acquired by the correction data acquiring unit is used in the client apparatus, and a modification rate of the correction data;

a charge calculating unit which calculates a charge corresponding to a process of sending the correction data transmitted from the correction data transmitting unit, the charge calculating unit calculating the charge based on the service point calculated by the service point calculating unit and the correction accuracy of the correction data calculated by the correction data accuracy calculating unit; and a charge notifying unit which notifies the client apparatus of the charge calculated by the charge calculating unit.

5. The printing program according to claim 4, wherein the printing program allows a computer of the server apparatus to function as:

a printing data acquiring unit which acquires printing data used for printing; a printing data correcting unit which corrects the printing data acquired by the printing data acquiring unit, on the basis of the correction data received by the correction data receiving unit; a printing unit which performs printing, on the basis of the printing data corrected by the printing data correcting unit; and a consumable ordering unit which places an order for a consumable used for the printing unit with the server apparatus and, the printing program allows the computer of the server apparatus to function as:

a consumable order receiving unit which receives an order from the consumable ordering unit; and a consumable delivery unit which deliveries a predetermined consumable to the client apparatus, on the basis of information on the order received by the consumable order receiving unit and, the charge calculating unit calculates a delivery charge corresponding to the delivery of the predetermined consumable to the client apparatus and notifies the delivery charge to the client apparatus.

6. The printing program according to claim 5, wherein the printing program allows a computer of the server apparatus to function as:

the computer of the server apparatus to function as a service point calculating unit which calculates a service point on the basis of the request to transmit the correction data or information received from the client apparatus, and the charge calculating unit of the server apparatus calculates the delivery charge, on the basis of the service point calculated by the service point calculating unit.

7. A printing method that uses a client apparatus for dealing with printing data and a server apparatus connected to the client apparatus so as to communicate therewith, wherein the client apparatus performs:

requesting the server apparatus to transmit correction data used for correcting the printing data;

receiving predetermined correction data transmitted from the server apparatus in response to the request to transmit the correction data;

receiving billing information on the received correction data; and performing a predetermined billing process on the basis of the received billing information, and the server apparatus performs:

receiving the request to transmit the correction data from the client apparatus;

acquiring predetermined correction data corresponding to the received request for the correction data;

transmitting the acquired correction data to the client apparatus;

modifying the correction data acquired by the correction data acquiring unit and transmitting the modified correction data to the correction data transmitting unit;

calculating correction accuracy of the modified correction data calculating a service point associated with the client apparatus based on the request to transmit the correction data received from the client apparatus, a frequency that the correction data acquired by the correction data acquiring unit is used in the client apparatus, and a modification rate of the correction data;

calculating a charge corresponding to a process of sending the transmitted correction data, the charge being based on the calculated service point and the calculated correction accuracy of the modified correction data; and notifying the client apparatus of the calculated charge.

8. The printing method according to claim 7, the server apparatus performs:

a portion of the charge, on the basis of the service point, on the client apparatus that frequently uses the correction data.

9. The printing method according to claim 8, the client apparatus further performs:

acquiring printing data used for printing; correcting the acquired printing data, on the basis of the correction data received in the receiving of the correction data; performs printing, on the basis of the corrected printing data; and placing an order for a consumable used for the printing unit with the server apparatus, and the server apparatus further performs: receiving the order from the client apparatus; and delivering a predetermined consumable to the client apparatus, on the basis of information on the order from the client apparatus and, in the calculating of the charge, a delivery charge corresponding to the delivery of the predetermined consumable to the client apparatus is calculated, and the delivery charge is notified to the client apparatus.

10. The printing method according to claim 9,
the client apparatus further performs:
the server apparatus further performs calculating a service point on the basis of the request to transmit the correction data or information received from the client apparatus.

* * * * *